United States Patent
Newman et al.

(10) Patent No.: US 8,731,015 B2
(45) Date of Patent: May 20, 2014

(54) COMPACT $CO_2$ SLAB-LASER

(71) Applicant: Coherent, Inc., Santa Clara, CA (US)

(72) Inventors: Leon A. Newman, Glastonbury, CT (US); Adrian Papanide, Shelton, CT (US); Mathew David Rzewnicki, Ludlow, MA (US); Thomas V. Hennessey, Jr., Lebanon, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 13/757,948

(22) Filed: Feb. 4, 2013

(65) Prior Publication Data

US 2013/0259074 A1 Oct. 3, 2013

Related U.S. Application Data

(60) Provisional application No. 61/618,145, filed on Mar. 30, 2012.

(51) Int. Cl.
*H01S 3/04* (2006.01)

(52) U.S. Cl.
USPC ............... 372/34; 372/35; 372/55; 372/57; 372/66

(58) Field of Classification Search
USPC ......................... 372/34, 35, 55, 57
See application file for complete search history.

(56) References Cited

U.S. PATENT DOCUMENTS

| | | | |
|---|---|---|---|
| 5,331,466 A | 7/1994 | Van Saarloos | |
| 5,748,663 A * | 5/1998 | Chenausky | 372/64 |
| 6,697,408 B2 | 2/2004 | Kennedy et al. | |
| 6,788,722 B1 | 9/2004 | Kennedy et al. | |
| 6,826,204 B2 | 11/2004 | Kennedy et al. | |
| 7,263,116 B2 | 8/2007 | Shackleton et al. | |
| 7,755,452 B2 | 7/2010 | Knickerbocker et al. | |
| 7,756,182 B2 | 7/2010 | Newman et al. | |
| 7,889,775 B2 | 2/2011 | Hua | |
| 7,970,038 B2 | 6/2011 | Shackleton et al. | |
| 2004/0179570 A1 | 9/2004 | Vitruk et al. | |
| 2004/0252385 A1 | 12/2004 | Berto et al. | |

(Continued)

FOREIGN PATENT DOCUMENTS

| | | |
|---|---|---|
| EP | 0555778 A2 | 8/1993 |
| EP | 2214271 A2 | 8/2010 |
| JP | 2002-237632 A | 8/2002 |
| WO | 2008/118342 A1 | 10/2008 |

OTHER PUBLICATIONS

Invitation to pay additional fees received for PCT Patent Application No. PCT/US2013/033611, mailed on Jul. 5, 2013, 4 pages.

(Continued)

*Primary Examiner* — Dung Nguyen
(74) *Attorney, Agent, or Firm* — Morrison & Foerster LLP

(57) ABSTRACT

A compact $CO_2$ slab-laser is contained in a fluid cooled housing having three compartments. One compartment houses discharge electrodes and a laser resonator. Another compartment houses a radio-frequency power supply (RFPS) assembled on a fluid-cooled chill plate and an impedance-matching network. The remaining compartment houses beam-conditioning optics including a spatial filter. The housing and RFPS chill-plate are on a common coolant-fluid circuit having a single input and a single output. The spatial filter is optionally fluid-coolable on the common coolant fluid circuit.

13 Claims, 23 Drawing Sheets

(56) References Cited

U.S. PATENT DOCUMENTS

| | | |
|---|---|---|
| 2006/0029116 A1 | 2/2006 | Shackleton et al. |
| 2008/0204134 A1 | 8/2008 | Knickerbocker et al. |
| 2010/0118901 A1 | 5/2010 | Newman |
| 2011/0182319 A1* | 7/2011 | Hua et al. .................. 372/55 |

OTHER PUBLICATIONS

International Search Report and Written Opinion received for PCT Patent Application No. PCT/US2013/033611, mailed on Oct. 28, 2013, 17 pages.

* cited by examiner

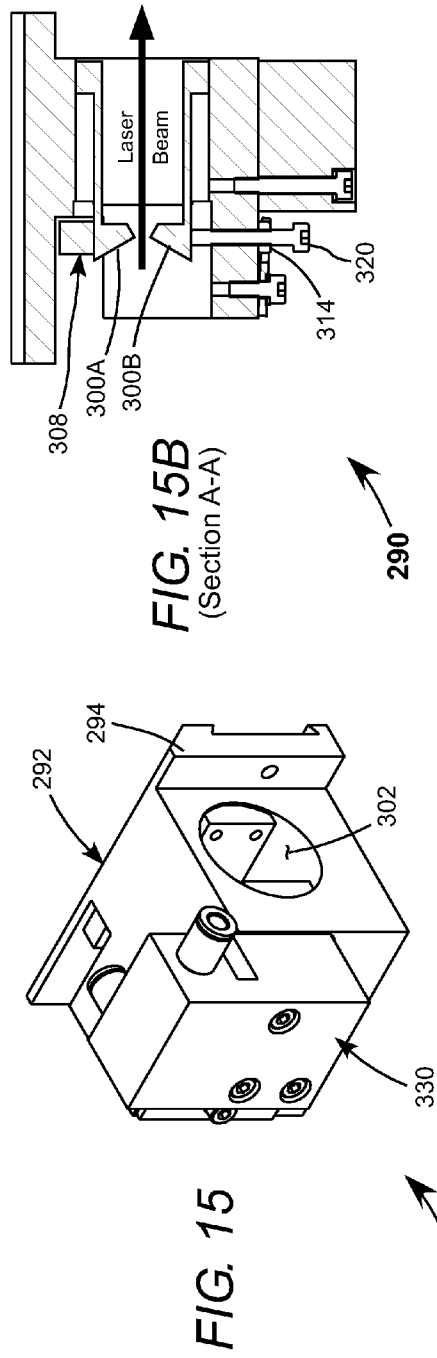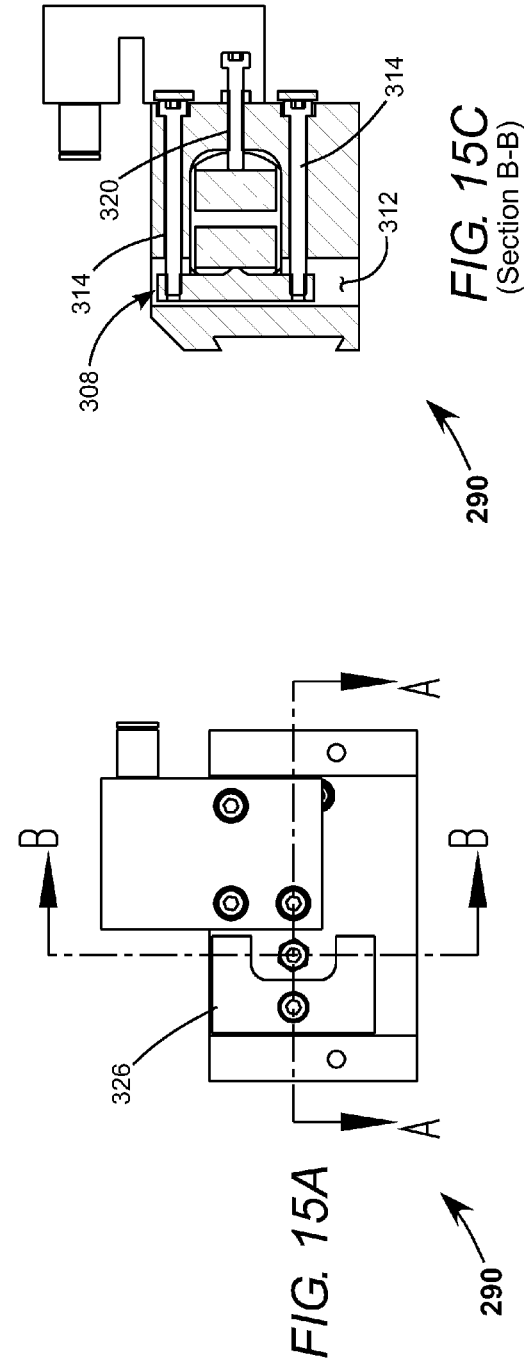

COMPACT CO₂ SLAB-LASER

PRIORITY

This application claims priority to Provisional Application No. 61/618,145, filed Mar. 30, 2012, the disclosure of which is incorporated herein by refenrece.

TECHNICAL FIELD OF THE INVENTION

The present invention relates in general to radio-frequency (RF) energized carbon dioxide ($CO_2$) gas-discharge lasers. The invention relates in particular to commercial packaging arrangements for such lasers.

DISCUSSION OF BACKGROUND ART

FIG. 1 schematically illustrates a prior-art packaging arrangement 10 for a high-power $CO_2$ slab-laser system 10. The arrangement includes three basic subsystems packaged in separate enclosures. The three subsystems are a solid-state high-power RF power supply (RFPS) in enclosure 12; an RF impedance-matching network in enclosure 14 including components required to match the output impedance of the RFPS to the input impedance of the laser-discharge; and a hermetically sealed $CO_2$ laser tube housing 16 that contains laser-discharge electrodes in a lasing-gas mixture and an optical resonator. A fourth subsystem containing optical components for modifying the output laser-beam is not shown in FIG. 1. This fourth subsystem includes a spatial-filter assembly for cleaning-up the laser beam, and lenses for shaping the laser beam; an optical detector for informing the user if a laser beam is being emitted; and an electronically controlled safety-shutter to protect the user from accidental laser radiation exposure.

In order to prevent stray RF radiation from causing electromagnetic (EM) interference, all three sub-assembly enclosures are typically grounded metal enclosures, and input and output ports of the enclosures are all heavily shielded. In order to prevent overheating at high-power laser operation, for example, operation at above 250 W of laser-output power, all three enclosures and the optical subsystem are provided with liquid cooling, as indicated schematically in FIG. 1.

DC power input 18, typically at 48 volts, is provided to the RFPS 12 An input-command signal port 20 is also provided to enable a system operator to provide turn-on and turn-off pulsing instructions to the RFPS, and also to provide open and close commands to the safety-shutter (not shown). RFPS 12 may also contain diagnostic circuitry for reporting the status of laser system 10, via line 22, to an operator.

From consideration of efficiency, size, and cost of the laser system, it is desirable to locate enclosures 12, 14, and 16, and the above discussed optical subassembly, as close together as possible. This serves to reduce RF and optical losses, in addition to reducing costs associated with providing interconnecting co-axial cables. This of course does not reduce basic cost and effort of building, cooling, and interconnecting the separate enclosures.

Some details of internal arrangements of enclosures 12, 14, and 16, and interconnections therebetween, are schematically depicted in FIG. 2. In RFPS enclosure 12 only an arrangement for combining the outputs of multiple amplifier stages via a plurality of coaxial cable sections 24 is depicted for simplicity of illustration. Such a power combining arrangement is described in U.S. Pat. No. 7,755,452 assigned to the assignee of the present invention, and the complete disclosure of which is hereby incorporated herein by reference.

The combined single output of the RFPS is passed through a well-shielded RF-interconnect box 26 to bring the combined power from the RFPS to an impedance-matching network 28, here, comprising inductances $L_1$ and $L_2$, and capacitors $C_1$ and $C_2$. Inductances $L_1$, $L_2$, and capacitor $C1$ are connected together at a common node 29. The output of impedance-matching network 28 connects to a hermetically sealed, low-impedance feed-through in enclosure 16, indicated by dashed outline 30, to match the impedance $Z_L$ of discharge-electrodes 34 and 36 of the laser.

Laser systems such as system 10 are typically integrated into much larger apparatus for carrying out some laser-process such as laser-machining, or laser heat-treatment. Because of this, there is always a demand for reducing the size and complexity of such a laser-system to make the laser-system more easily integrated into the laser-processing system and to make the processing system itself more compact.

SUMMARY OF THE INVENTION

The present invention is directed to $CO_2$ RF gas-discharge laser apparatus. In one aspect, apparatus in accordance with the present invention comprises a laser-housing formed from an elongated metal extrusion, the extrusion being configured to permit passage of coolant fluid therethrough for cooling the housing. First and second elongated discharge-electrodes are located in the laser housing. The electrodes are spaced apart and parallel to each other defining a discharge gap therebetween. The first electrode functions as a live-electrode and the second electrode functions as a ground electrode. The discharge-electrodes are configured to permit passage of coolant fluid therethrough for cooling the electrodes. First and second resonator mirrors are provided, the resonator mirrors defining a laser resonator extending though the discharge-gap between the discharge-electrodes. A radio-frequency power-supply (RFPS) having an operating frequency, and an impedance-matching network are located in the laser housing for supplying RF power to the electrodes for creating an RF discharge in the discharge gap for causing a laser beam to be generated in and delivered from the laser resonator. The RFPS is assembled on an elongated metal mounting-plate configured to permit passage of coolant fluid therethrough for cooling the RFPS assembled thereon.

In a preferred embodiment of the apparatus there is an arrangement for combining the coolant fluid passage through the metal extrusion, the electrodes and the metal mounting plate of the RFPS into a coolant-circuit with a single coolant-fluid input and a single coolant-fluid output. The coolant-circuit is arranged such that the coolant-circuit such that coolant fluid delivered into the coolant input flows, in sequence, through the metal housing extrusion; through the electrodes, and through the metal mounting plate of the RFPS before exiting the coolant circuit via the coolant output.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 15 is a three dimensional view schematically illustrating the spatial-filter assembly of FIG. 14 in an assembled form.

FIG. 15A is an elevation view schematically illustrating the spatial-filter assembly of FIG. 14 in an assembled form.

FIG. 15B is a cross-section view seen generally in the direction A-A of FIG. 15A schematically illustrating details of interaction of components in the assembly of FIG. 15.

FIG. 15C is a cross-section view seen generally in the direction B-B of FIG. 15A schematically illustrating further details of interaction of components in the assembly of FIG. 15.

DETAILED DESCRIPTION OF THE INVENTION

Figure 3:
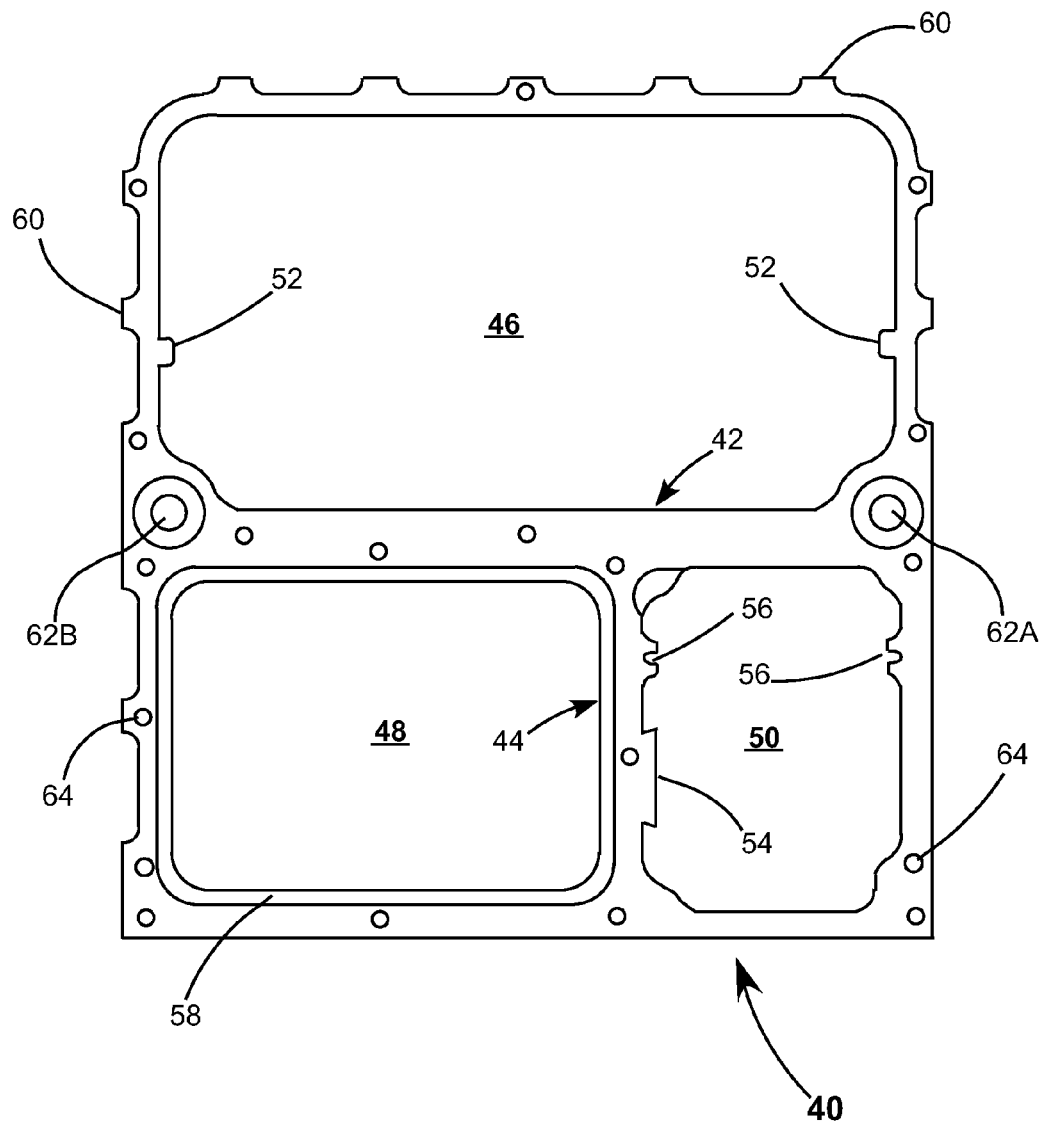
FIG. 3 is a lateral cross-section view schematically illustrating a fluid-cooled laser-housing extrusion for a laser-housing in accordance with the present invention, the extrusion having a first compartment for housing a RFPS and an impedance-matching network, a second compartment for housing an electrode assembly and an impedance-matching network, and a third compartment for housing beam conditioning optics including a spatial filter.

Referring now to the drawings, wherein like components are designated by like reference numerals, FIG. 3 is an unshaded lateral cross-section view schematically illustrating schematically illustrating an laser enclosure 40 in accordance with the present invention. The enclosure is formed primarily from a custom made aluminum extrusion, and is divided by internal walls 42 and 44 into separate compartments 46, 48 and 50. The compartments are hermetically sealed by end flanges which are not shown in FIG. 3 but are depicted in higher-numbered drawings and discussed further herein below. Exemplary external dimensions of the extrusion are a length of about forty-four inches, a height of about eight inches, and a width of about seven inches.

Compartment 46 is for enclosing the RFPS power supply of the laser and the impedance-matching network for the laser discharge electrodes. Accordingly this compartment combines the functions of enclosures 12 and 14 of the above discussed prior-art laser system. Compartment 48 is for housing the discharge-electrode sub-assembly of the laser, and, accordingly, corresponds to enclosure 16 of the prior-art laser-system. Compartment 50 is for housing the optics sub-assembly, discussed above, but not shown in prior-art drawings FIG. 1 or FIG. 2.

Along the inside of compartment 46 there are rails 52 for supporting the RFPS sub-assembly. Along the inside of compartment 50, there is a dovetail rail 54 and grooves 56 which are used to support components of the beam-shaping optics sub-assembly. At each end (only one shown) of compartment 48 there is a groove 58 arranged to accommodate a soft-metal seal which, cooperative with the end flange, provides for hermetically sealing the compartment for containing the lasing gas mixture. This is typically a mixture of $CO_2$, nitrogen ($N_2$) and helium (He), as is known in the art. Ribs 60 extending at various peripheral intervals along the extrusion, provide stiffness while allowing wall-thickness to be reduced to minimize weight.

There are two internal liquid-cooling passages (conduits) 62A and 62B provided, with each running down the length on a corresponding side of the extrusion. Preferably these are relatively large diameter passages. This eliminates a need to insert copper tubes within the passages, and a need for adding an corrosion-inhibitor to the coolant. This can be allowed by making the diameter of the cooling passages relatively large, for example, about ⅜ inches diameter in the context of the exemplary extrusion dimensions discussed above. A plurality of screw-holes 64 is provided for attaching end-flanges (end-plates or cover-plates).

Figure 1:
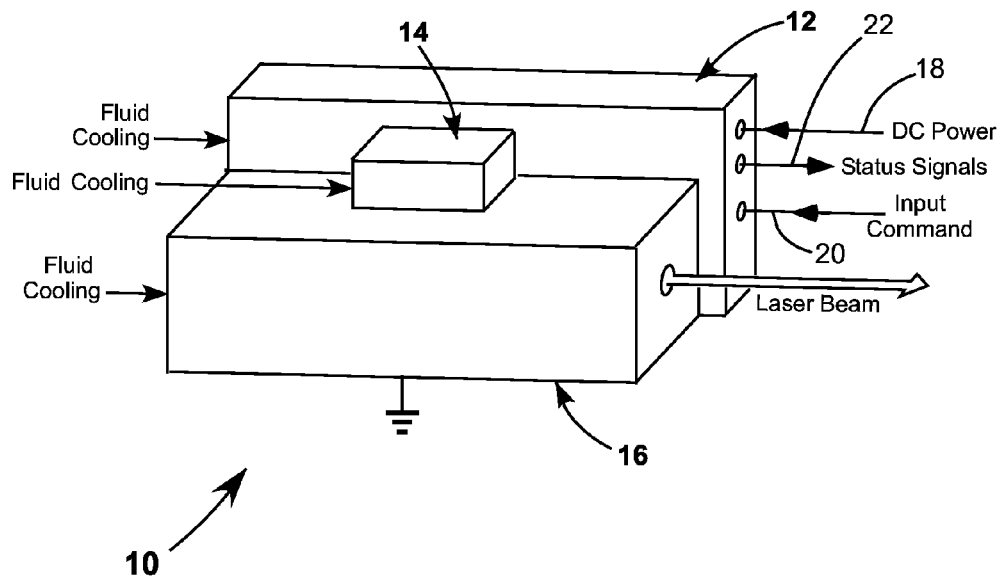
FIG. 1 schematically illustrates a prior art $CO_2$ slab-laser arrangement including a first housing containing discharge-electrodes and a laser resonator; a second housing containing a radio frequency power supply (RFPS), and a third housing containing an impedance-matching network for matching the RFPS output impedance to the impedance of the discharge electrodes.
Figure 2:
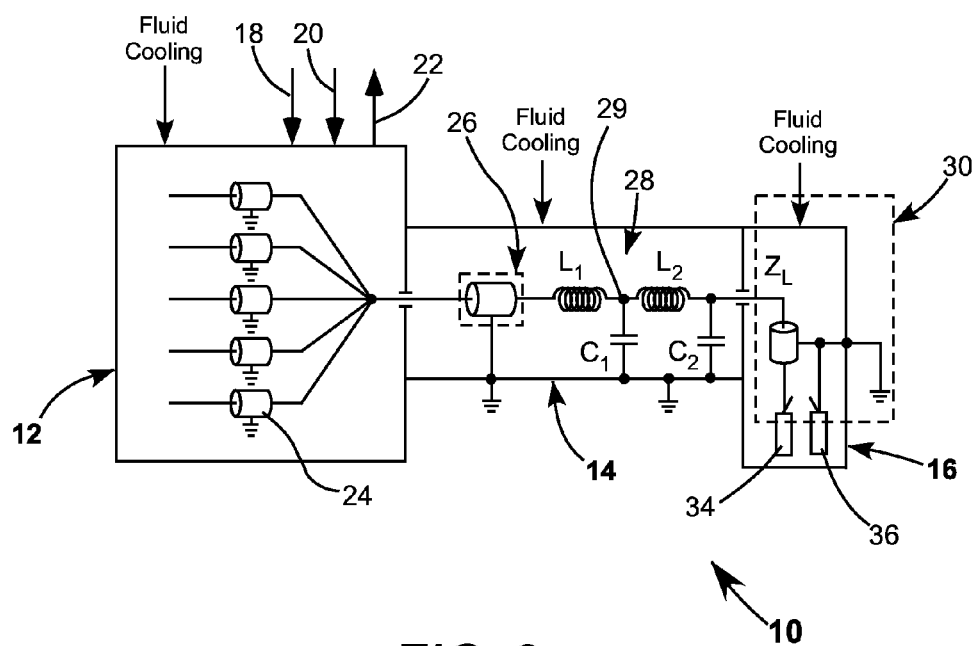
FIG. 2 is a circuit diagram schematically illustrating electrical components, connections, and feed-through arrangements in the slab-laser arrangement of FIG. 1.

Although corresponding sub-assemblies of the inventive laser are functionally equivalent to those of the prior-art laser of FIGS. 1 and 2, in order to accommodate the inventive laser system in the compartmented housing of FIG. 3 it was necessary to make certain modifications to the sub-assemblies. A description of these modifications is set forth below beginning with reference to FIGS. 4A, 4B, 4C and 4C, which schematically illustrate steps in providing an electrode-cooling arrangement that does not require electrical insulation from the laser housing.

Figure 4A:
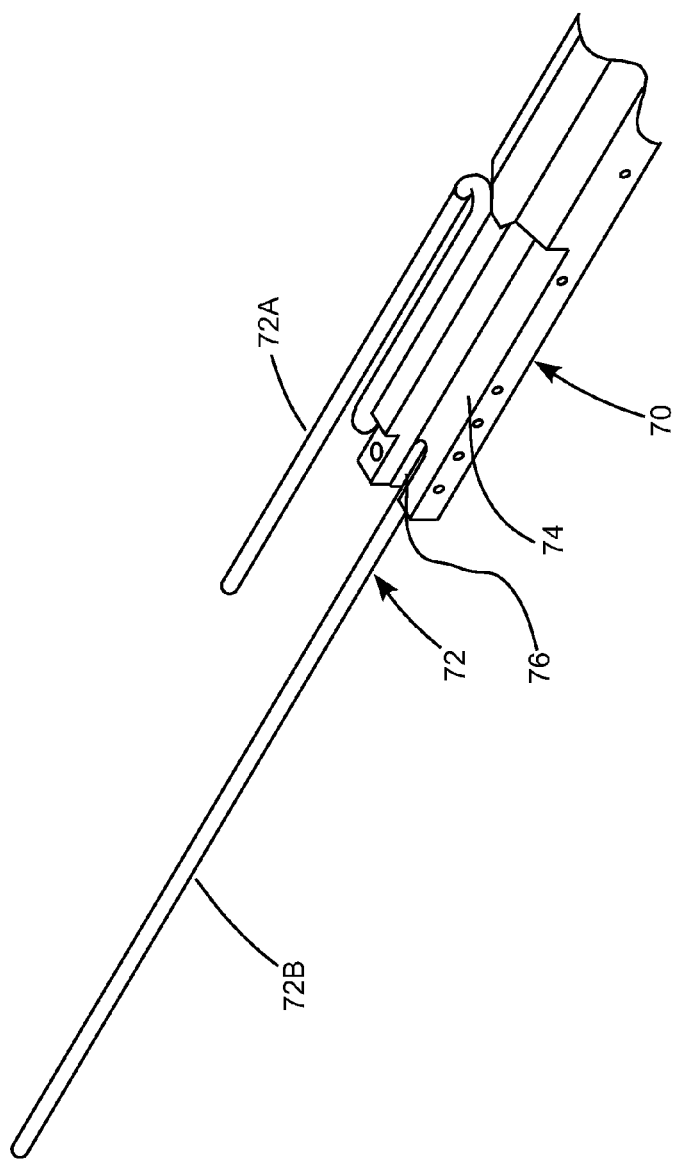
FIG. 4A, FIG. 4B, FIG. 4C, and FIG. 4D schematically illustrate steps in the formation of extended, folded, electrode-cooling tubes in accordance with the present invention for providing a very high RF-impedance between the electrodes and the laser housing.

FIG. 4A schematically illustrates an end portion of a live- or "hot"-electrode 70 of the laser. The corresponding ground-electrode is not shown for simplicity of illustration. An elongated U-shaped cooling tube 72 is inserted from the end of electrode 70 (not shown) into two bores (not shown) extending through the electrode. The length of the extended U-shaped cooling tube (at the hot-electrode potential during laser operation) is selected to provide that a sufficient length of tube projecting from the electrode such that, when twice folded parallel to itself, the extension provides a sufficiently high inductance at the RFPS-frequency (about 100 MHz) that it can contact a grounded enclosure without causing a short circuit. This means that it is possible to connect the cooling-tube to the laser-housing without a need to provide an insulated feed-through. This saves space and the associated cost of such a feed-through. In FIG. 4A, one end 72A of the tube is depicted as already twice-folded back on itself. The other end 72B is yet to be folded. Areas 74 of the electrode are relieved and grooves 26 (only visible on one side in FIG. 4A) are provided to accommodate the twice-folded ends of the tube. For a 100-MHz operating frequency the tube preferably has an unfolded length of at least about twelve inches (12").

Figure 4B:
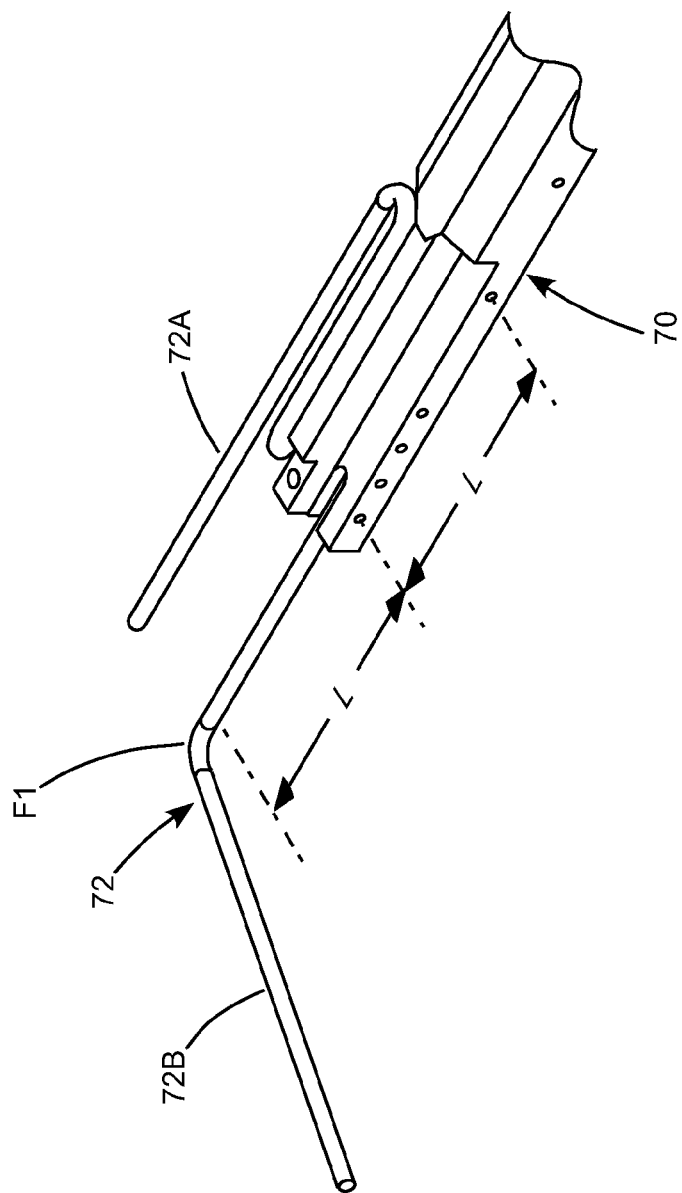
Figure 4C:
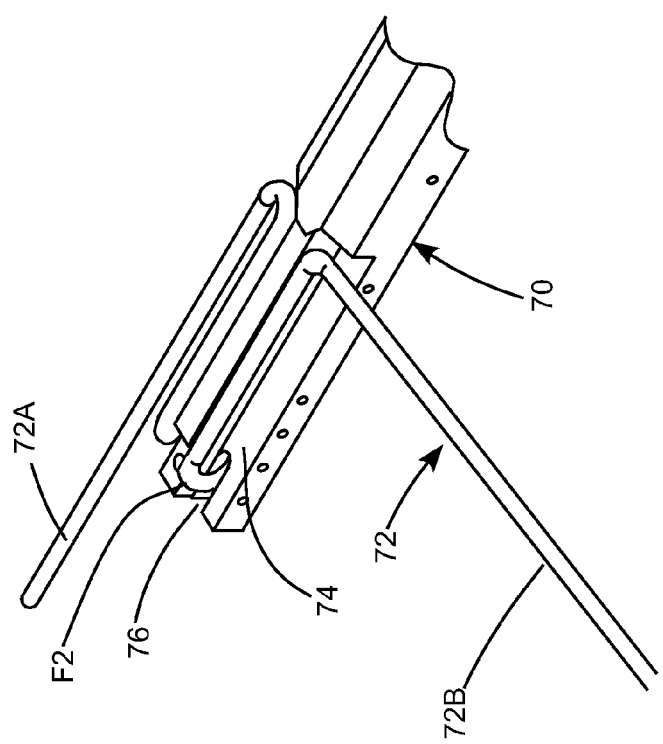
Figure 4D:
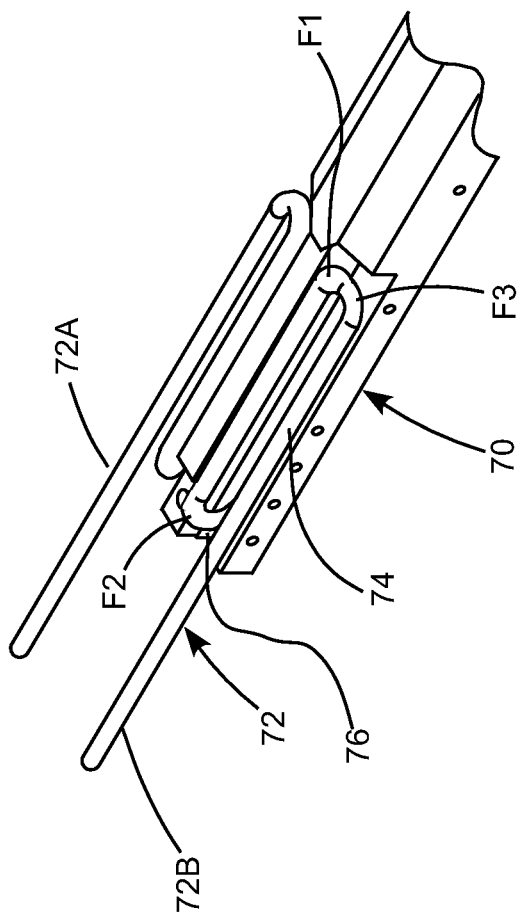

FIG. 4B depicts a first fold, formed in end 72B of cooling-tube 70 at a distance L from the end of the electrode about equal to the length of the relieved portion of the electrode. FIG. 4C depicts a second, U-shaped fold F2 formed in end 72B of the tube to fold the tube-end into groove 76 and along relieved portion 74 of the electrode. FIG. 4D depicts a third fold F3 added to fold F1 in order to fold end 72B of the tube back on itself along relieved portion 74 of the electrode.

Figure 5:
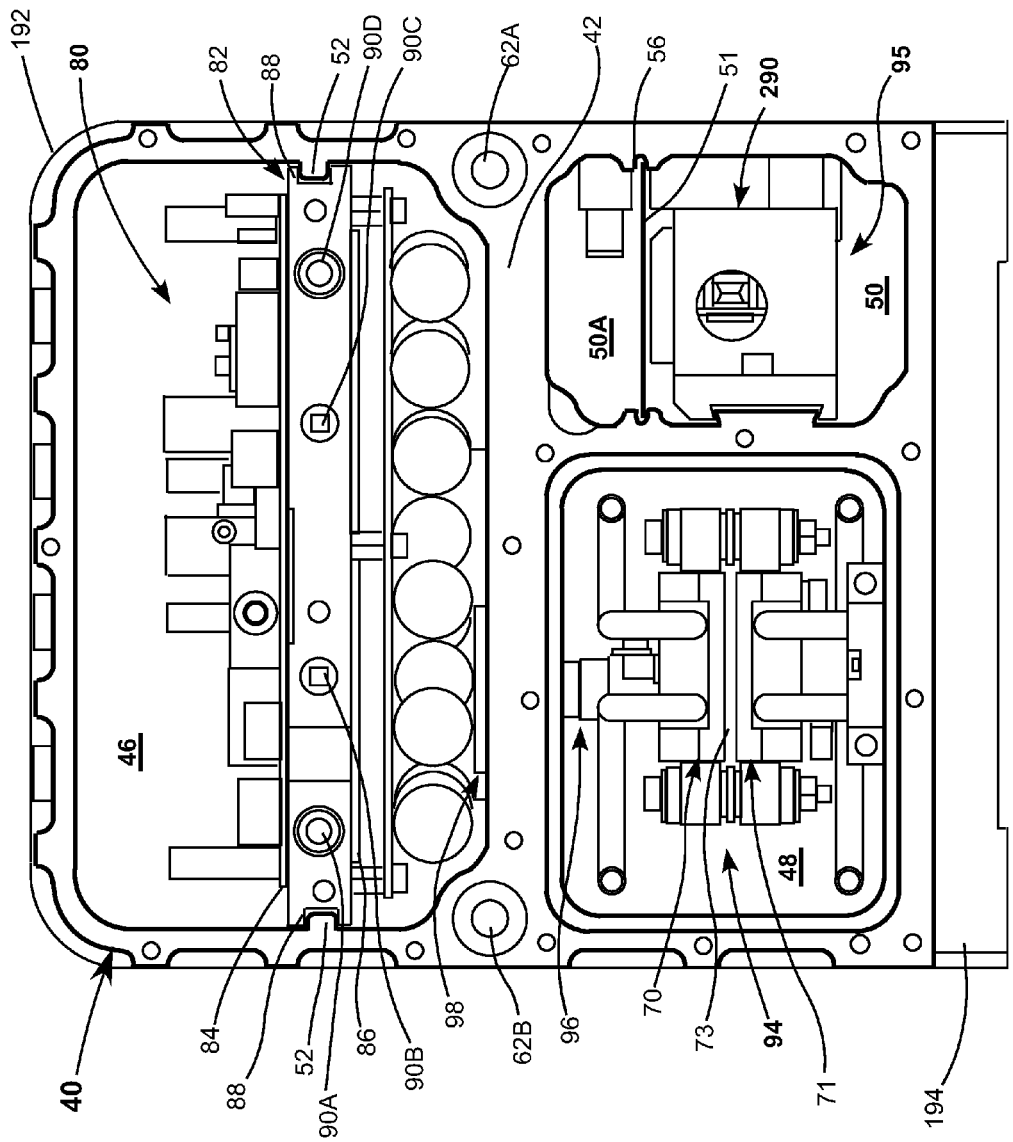
FIG. 5 is a lateral cross-section view schematically illustrating the extrusion of FIG. 3 with an electrode assembly including live and ground electrodes, an RFPS and associated impedance matching circuit, and the spatial filter installed in corresponding compartments, the RFPS being assembled on a fluid cooled chill-plate.

FIG. 5 is a lateral cross-section view schematically depicting extrusion 40 of FIG. 3 with laser sub-assemblies installed. This drawing is reproduced from actual engineering drawings of a laser-prototype and includes many details of the sub-assemblies, thereby providing a graphic description of the compactness of the inventive laser. Only those details of the subassemblies that are considered novel and important are identified and discussed at this point in the present description. Further details are discussed hereinbelow, with accompanying illustration where appropriate.

The RFPS 80 is installed in compartment 46. Electronic components of the RFPS are mounted on printed circuit boards (PCBs) 84 and 86 mounted in thermal contact with opposite sides of a metal cooling-plate (chill-plate) 82. Plate 82 is itself preferably an aluminum extrusion plate. The PCBs have multi-layer interconnects providing a reduced surface area of the RFPS. The cooling-plate also has grooves 88 machined along the length of opposite edges of the plate, which allows the RFPS subsystem to slide into compartment 46 riding on rails 52 therein. The cooling-plate has internal coolant passages 90A, 90B, 90C and 90D, formed during the extrusion process and extending, parallel to each other, through the length of the cooling plate. Passages 90B and 90C are depicted as plugged in FIG. 5 for reasons discussed below.

Figure 5A:
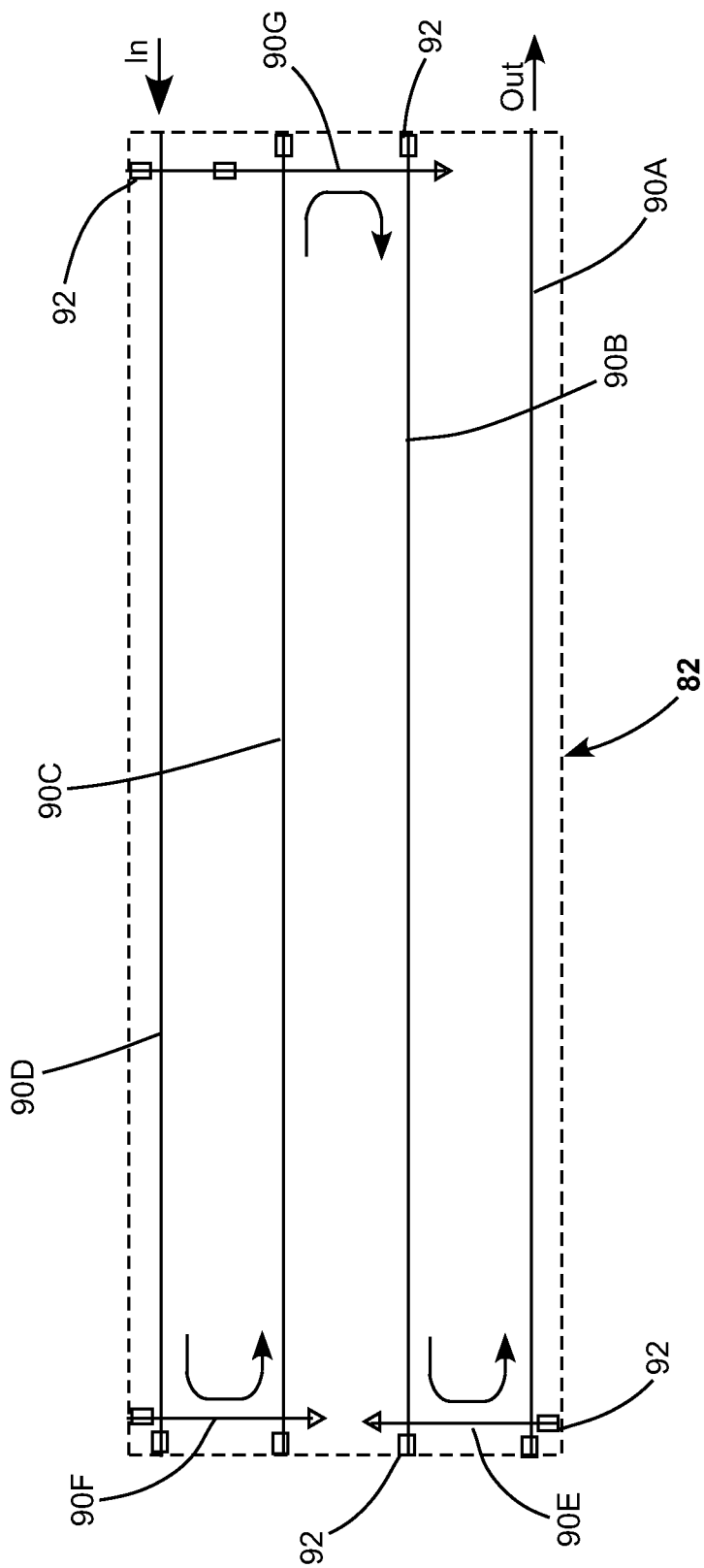
FIG. 5A is a plan view schematically illustrating a preferred arrangement of fluid-cooling channels in the RFPS chill-plate of FIG. 5.

FIG. 5A schematically illustrates the arrangement of longitudinal channels 90A-D formed during extrusion of the cooling-plate and cross-channels. The cooling-plate outline is depicted in phantom. After the extrusion of the plate, blind cross-channels 90E, 90F, and 90 G are drilled into the cooling plate. Channel 90E connects channels 90A and 90B; channel 90F connects channels 90C and 90D; and channel 90G connects channels 90B and 90C. Using a suitably located plurality of channel plugs 92, cooling-fluid (coolant-fluid) input into channel 90D is forced, as indicated by arrowheads, to follow a path through channels 90D, 90F, 90C, 90G, 90B (in the sequence recited), exiting via channel 90A.

Continuing now with reference again to FIG. 5, in compartment 48 of extruded housing 40, is located discharge-electrode assembly 94 of the inventive laser. This assembly comprises live-electrode 70 discussed above, and a ground-electrode 71 spaced apart from electrode 70, and leaving a discharge gap 73 between the live- and ground-electrodes. Additional details of the electrode assembly and connection thereof to the RFPS and the housing (for grounding) are discussed further hereinbelow. Of note in FIG. 5, however, is an RF connector assembly 96 extending from the RFPS in compartment 46, through an insulated hermetic seal 98 in wall 42 separating the RFPS compartment from the electrode and resonator compartment and the beam-conditioning-compartments components. The manner in which a beam generated in compartment 48 is transported into compartment 50 is described further hereinbelow.

The beam-conditioning components include a novel spatial-filter assembly 290, a detector (not visible in FIG. 5) to inform a user whether or not a laser beam is being generated, and a safety shutter (also not visible in FIG. 5) to prevent delivery of a laser-beam when not required. These detector and shutter arrangements require an electrical wiring harness. A metal plate 51 retained in grooves 56 provides a sub-compartment 50A for the wiring harness (not shown) in compartment 50. Plate 51 shields the harness from heat generated in the beam-conditioning components.

In FIG. 5 is depicted an optional cover 192 for extrusion 40. Also depicted is one (194) of two mounts attached to the housing for providing a kinetic platform for the laser. These features are discussed further hereinbelow.

It should be borne in mind when reading this description that only the electrode-assembly compartment 48 is hermetically sealed. This sealing is required as this is the compartment that contains the lasing-gas mixture. RF-sealing of the other compartments is required to prevent RF leakage out of the laser.

Figure 6A:
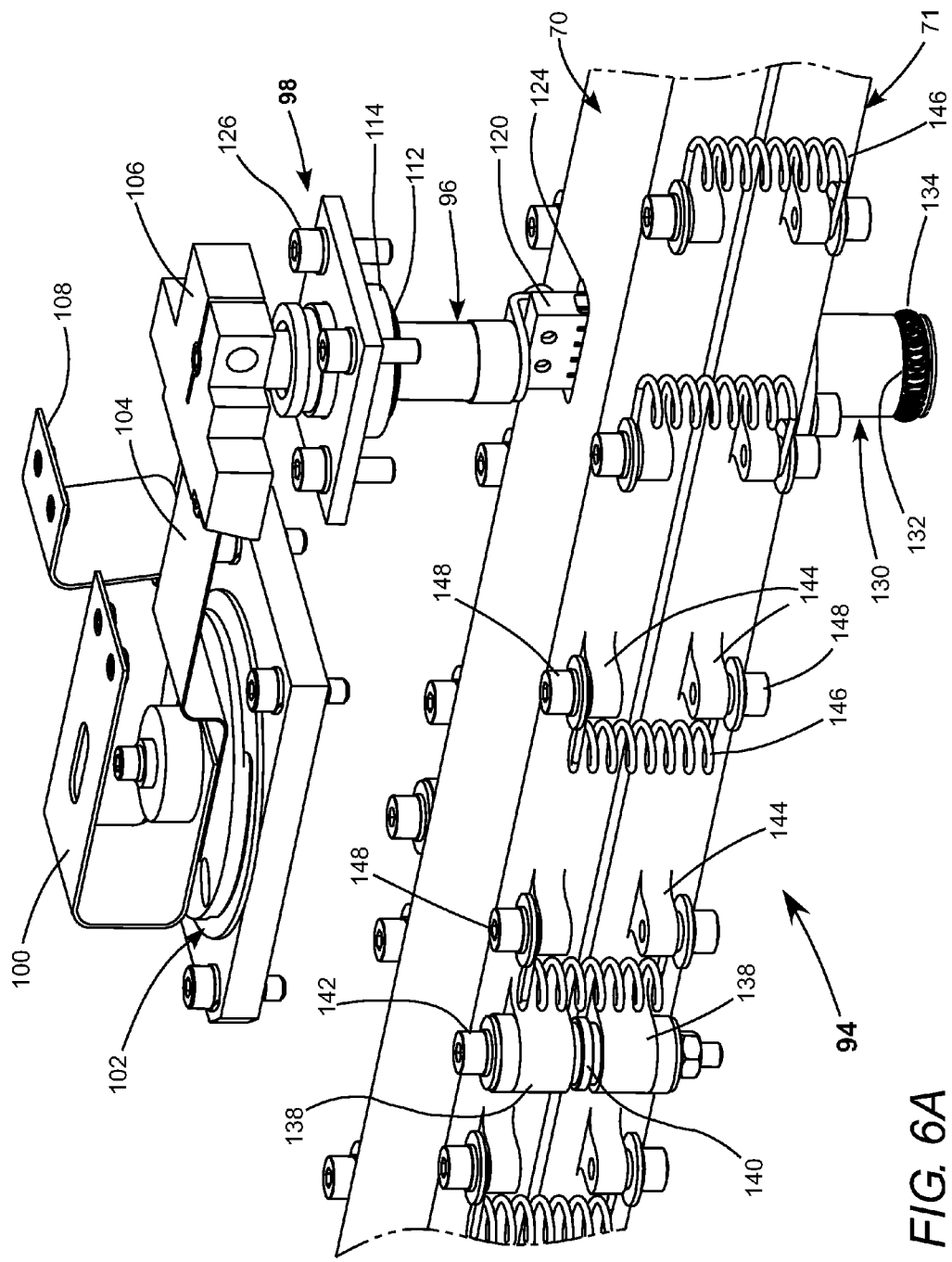
FIG. 6A is a fragmentary three-dimensional view schematically illustrating an arrangement for connecting the impedance-matching network in the first compartment of the housing of FIG. 5 with the live electrode of the electrode assembly in the second compartment of the housing of FIG. 5.
Figure 6B:
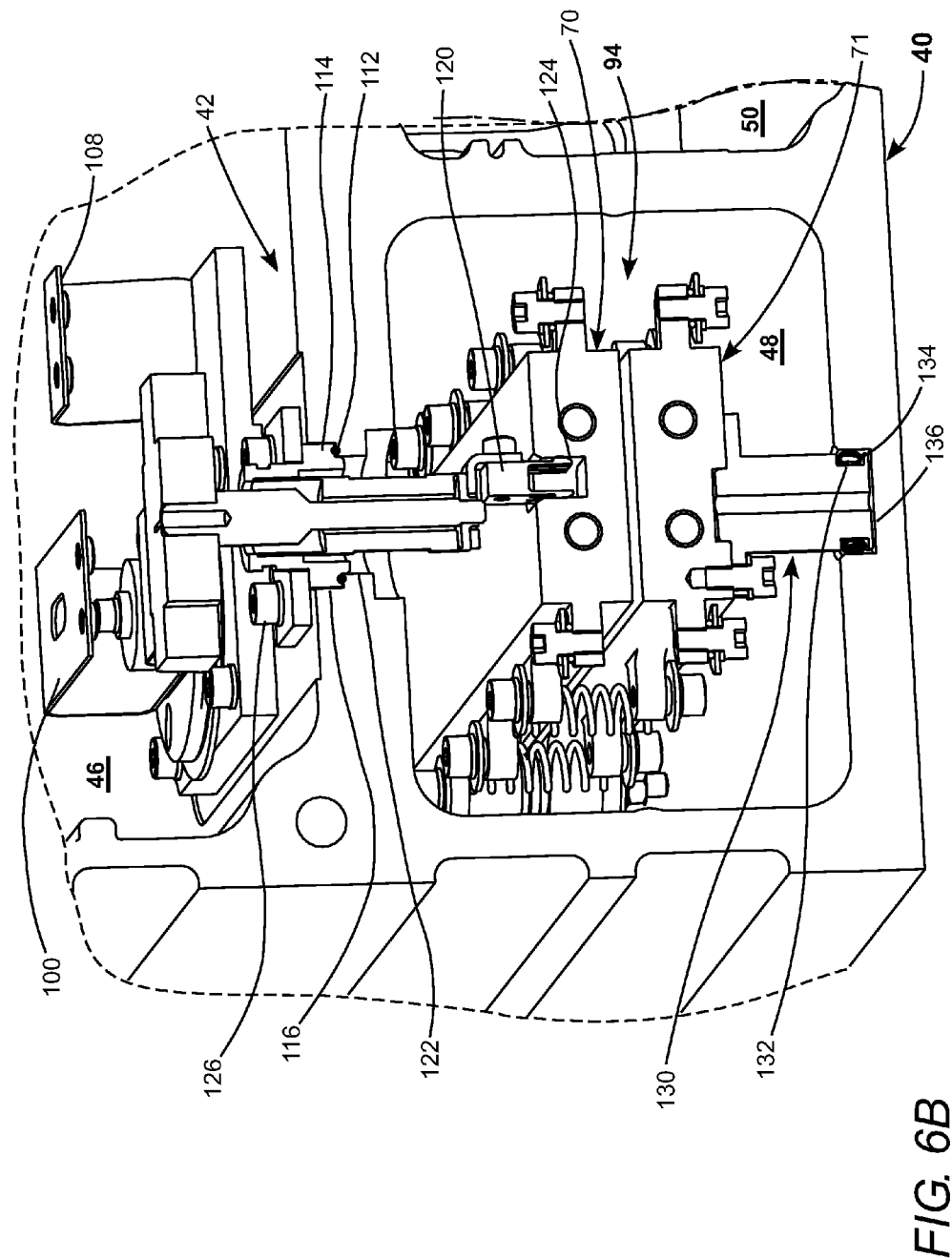
FIG. 6B is a fragmentary three-dimensional view schematically illustrating further detail of the live-electrode connection of FIG. 6A and detail of a connection of the ground electrode to the base of the second compartment.

FIG. 6A and FIG. 6B are three-dimensional views schematically illustrating details of electrode assembly 94 of FIG. 5 and the manner in which that electrode assembly connects with the RFPS in compartment 46. The assembly is depicted primarily in FIG. 6A, while FIG. 6B depicts details of the assembly installed in compartment 48 of the inventive extruded housing 40 of FIG. 5. The assembly includes innovations required to make the assembly compatible with integration into extruded housing 40.

The RFPS connects with live-electrode 70 of the assembly initially via a copper strap connector 100 attached thereto. In terms of the prior art arrangement of FIG. 2, this strap connects to common node 29 of FIG. 2, where capacitor $C_1$ and inductor $L_2$ are also connected. In the arrangement of FIGS. 6A and 6B, $C_1$ is a variable disc-capacitor designated by reference numeral 102. Copper strap 100 has a distributed inductance equal to inductance $L_1$ of FIG. 2. Copper strap 104 in FIG. 6A has distributed inductance $L_2$ of FIG. 2 and connects to the hermetically sealed feed-through 98 by means of a copper clamp 106 that serves as both a heat-sink and an RF-connector to the hermetically sealed feed-through. For higher-power lasers (greater than about 250 W laser-output), the clamp-connection should be liquid (fluid) cooled. A copper strap 108 is provided for connecting the RFPS and the impedance-matching network to the extruded aluminum housing. An indium seal (soft-metal seal), 112, is provided between a metal lip 114 on hermetically sealed feed-through 98 and a recess 116 machined in the wall 42 of the extruded housing (see FIG. 6B).

A beryllium-copper extension 120 having a spring-fingers contact is mounted on post 96. This type of contact is described in detail in US Pre-Grant Publication No. US2010/0118901 assigned to the assignee of the present invention, and the complete disclosure of which is hereby incorporated herein by reference. The post, and the spring-fingers contact thereon, is inserted through an aperture 122 in wall 42 with the spring-fingers spring-pressured against the sides of a recess 124 machined into the top of the live-electrode. The feed-through assembly is held against wall 42 of the housing by four screws 126 threaded into wall 42 (see FIG. 6B).

About half-way down the length on the bottom of ground-electrode 71, a round, aluminum, electrical-grounding post 130 is attached to the underside of the ground electrode. Near the end of the grounding post 130, a recessed ring 132 is machined, into which is pressed a "canted coil spring" 134 to make ground-contact with extruded housing 40. Grounding post 130 and its canted coil spring 134 are pressed into a round blind-hole 136 machined into the bottom inside surface of housing 40 (see FIG. 6B. The use of an electrical-grounding post with a canted coil spring pressed into a blind hole in the bottom of the laser system housing, for making a good electrical ground contact is an inventive arrangement for facilitating installation of the electrode assembly into compartment 48 of the extruded aluminum housing.

Continuing with reference to FIGS. 6A and 6B, live-electrode 70 and ground-electrode 71 have lugs 138 (only two, i.e., one pair, visible in FIG. 6A) periodically machined, integral with the electrodes, down the length of each side thereof. Holes are drilled through the lugs. For a 250 W laser, the electrode-dimensions were selected to be 1.73 inches wide and about 32.5 inches long. The spacing between the parallel facing electrodes is maintained by round, thin, ceramic washers 140 that are inserted between matching lugs 138 compressed together by bolts 142 passed through the holes in the lugs. Computer analysis has shown that for an electrode-length of about 32.5 inches, a minimum of about four lug-pairs on each side of the electrodes is normally sufficient to maintain a required parallelization over the temperature variation range expected to be experienced by the electrodes. The separation between the electrodes is adjusted by changing the thickness of the ceramic washers to obtain the best beam quality and the highest laser-efficiency. The spacing between the electrodes is determined by many factors, among which are RF frequency, gas-mixture composition, and gas pressure. The electrode spacing is typically varied experimentally by a manufacturer until a good laser-beam quality and efficiency are obtained. A spacing of about 0.1 inches is a good value from which to start searching experimentally for the optimum spacing for a 100 MHz, RF-excited slab-laser.

Secondary lugs 144 are provided between the space-maintaining lugs 138 for connecting inductor coils 146 periodically between the hot and ground electrodes and distributed evenly down their length. The coils are held in place by screws 148. For the above-discussed electrode parameters, about five coils 146 are distributed between each pair of space-maintaining lugs 138. The purpose of these inductor coils is to flatten-out voltage distribution down the length of the electrodes in order to prevent "hot" spots from occurring in the glow discharge.

Figure 7:
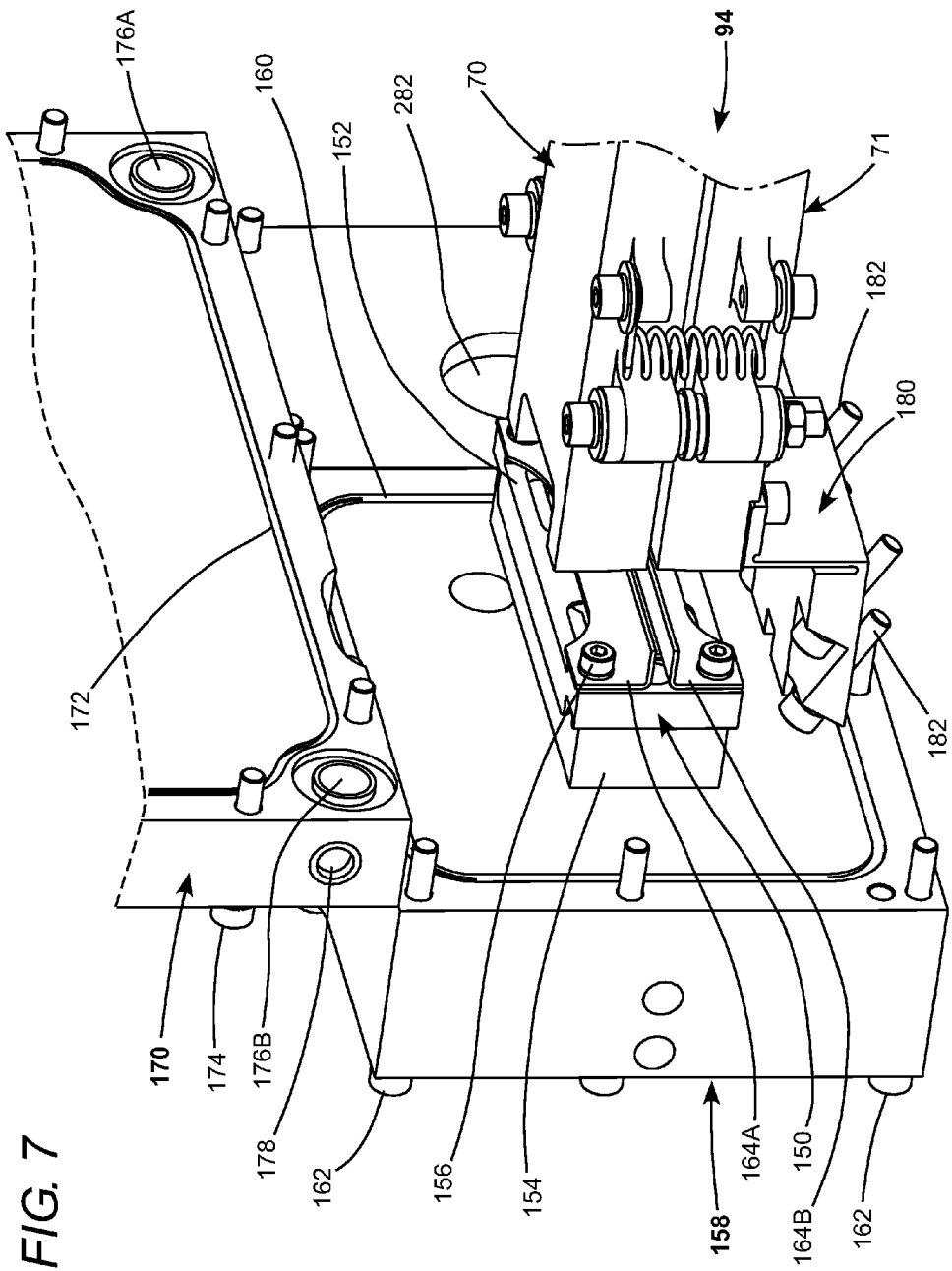
FIG. 7 is a fragmentary three-dimensional view schematically illustrating details of mounting of a highly reflecting end mirror of the laser resonator on an end plate of the second compartment of the housing of FIG. 5, and details of a mounting arrangement for the electrode assembly on the base of the second compartment of the housing.

FIG. 7 schematically illustrates details of the mounting of a high-reflecting, rectangular-shaped, silicon (Si), concave, feedback-mirror assembly 150 of a negative branch unstable resonator extending between electrodes 70 and 71 of electrode assembly 94. Mirror 150 is covered along edges thereof by an aluminum sheet metal cover 152 that has integral flat springs machined around a rectangular central opening to expose the reflecting surface of the mirror. Edges of the mirror are held down against a mounting plate 154 when the cover 152 is screwed into the mounting plate via screws 156. Shields 164A and 164B attached to the minor protect the minors from the discharge created by the circulating in the laser resonator cavity making transitions from the waveguide created by the electrodes, through free-space to the mirror and back into the electrode-defined waveguide.

As will be discussed further a laser beam generated by the resonator exits the electrode assembly compartment via a window in an end plate thereof and is directed by minors attached to the end-plate into the beam shaping component compartment. The beam is eventually delivered as output from the housing via a window 282.

Mounting plate 154 is attached to a post (not visible in FIG. 7) machined into aluminum end flange 158. The post is connected to the end flange by a thin flexible diaphragm (also not visible) that remains after the post is machined. The minor is aligned within the hermetically-sealed laser-housing by three screws located (also not visible) outside the hermetically sealed laser-housing that push against the end of the post thereby permitting alignment of the minor from outside the housing. Further illustration of this and similar mirror alignment arrangements are described and depicted in other drawings referred to hereinbelow.

End-flange (end-plate) 158 is clamped against the extruded laser-housing (not shown) with a soft-metal C-ring seal located in a machined grove 160 engaging the corresponding groove of the housing (see groove 58 of FIG. 3). The end-flange clamping is accomplished by threading screws 162 into the housing.

Also depicted in FIG. 7 is an end-cover 170 for the RFPS compartment of the housing (compartment 46 in FIG. 3). End-cover 170 prevents RF leakage from RFPS compartment assisted by a metal mesh gasket 172. Gasket 172 is compressed between the cover 170 and the end of the RFPS by screws 174. The two holes 176A and 176B near the bottom of the RFPS compartment cover the liquid-coolant inlet and outlet apertures leading to cooling passages along the extruded housing (see FIG. 3 passages 62). A plug 178 plugs a cross-drilled channel (not shown).

Figure 7B:
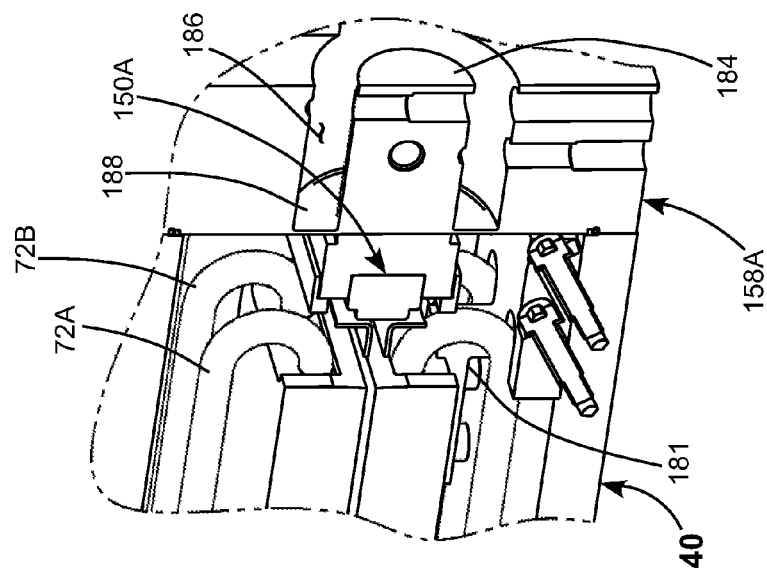
FIG. 7A and FIG. 7B schematically illustrate further details of electrode and minor mounting in the second compartment of the housing of FIG. 7 at each end of the housing.
Figure 7A:
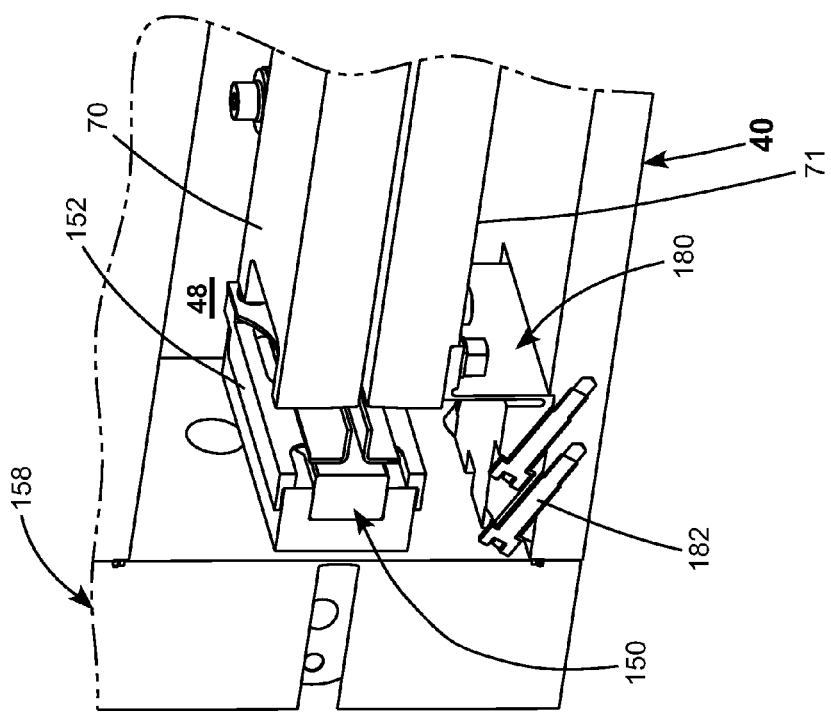

Continuing with reference to FIG. 7, and with reference in addition to FIG. 7A and FIG. 7B, electrode assembly 94 is attached to the base of compartment 48 of extrusion 40 via an aluminum flexure 180. The flexure is attached to ground-electrode 71 and is attached to the base of compartment 48 by angled screws 182 (see FIG. 7A).

At the resonator-output end of the electrode assembly (FIG. 7B) the electrode assembly is attached to extrusion 40 by a stiff bracket 181. The configuration of the output mirror (150A) assembly is similar to that of mirror 150, including discharge-shields. The mirror-150A assembly is mounted on an end-flange 158A in which can be seen a machined mirror-adjustment post 184 (as discussed above for mirror 150); a recess 186 resulting from the machining; and a diaphragm portion 188 of the flange residual from the machining.

Figure 8:
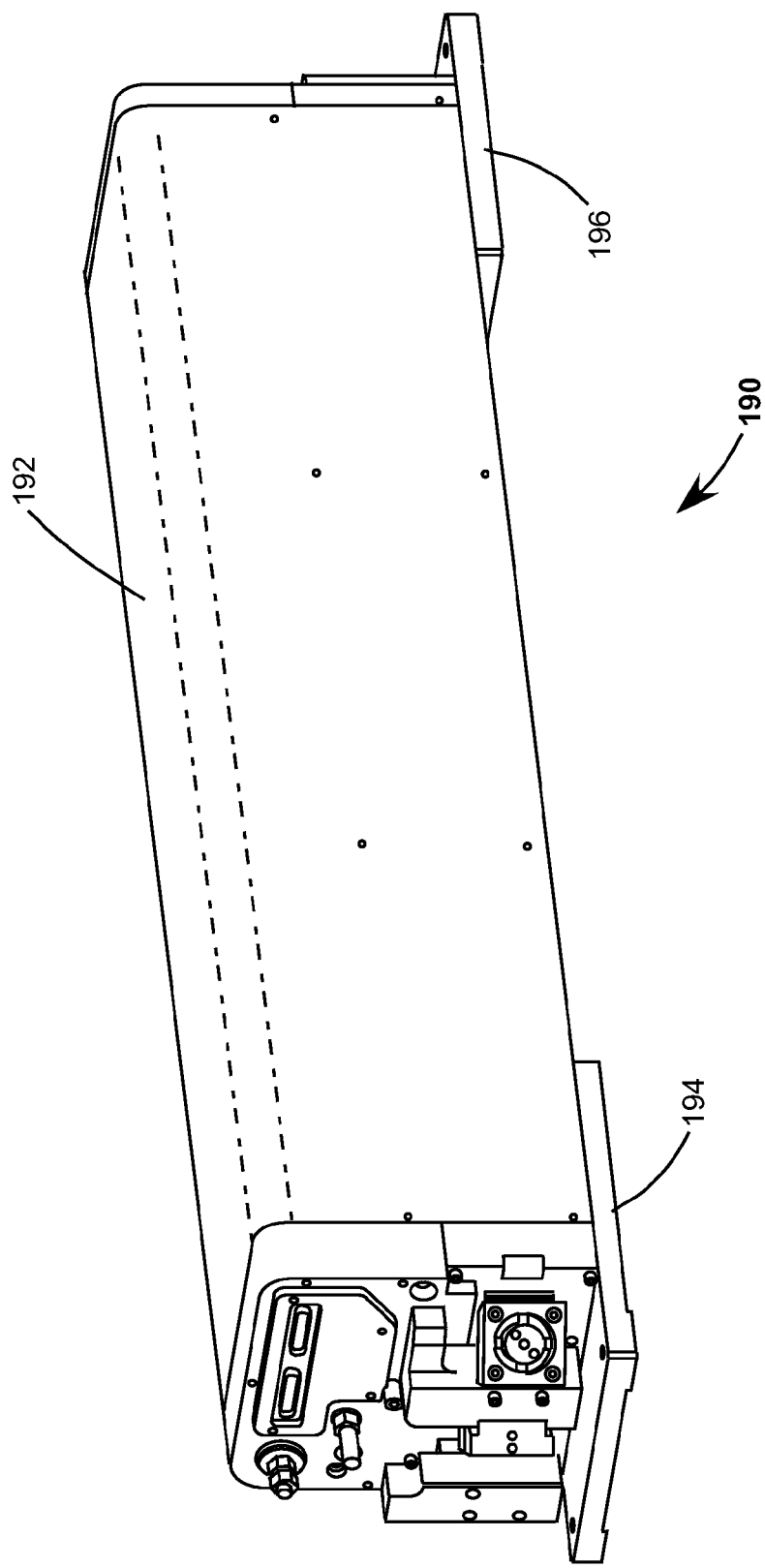
FIG. 8 is a three-dimensional view schematically illustrating a preferred embodiment of a laser in accordance with the present invention including the extruded housing of FIG. 5 with a housing-cover.

FIG. 8 is a three-dimensional view schematically illustrating a complete laser 190 in accordance with the present invention. This is viewed from the resonator-output end of the laser. Output of the laser occurs at the opposite and after the beam from the resonator has passed through the beam-conditioning components. Laser 190 includes optional cover 192 of FIG. 5, with a two-point mount 194 and a one-point mount 196 attached to the extruded housing. Mounts 194 and 196 provide, in effect, a kinetic platform for the laser.

Figure 8A:
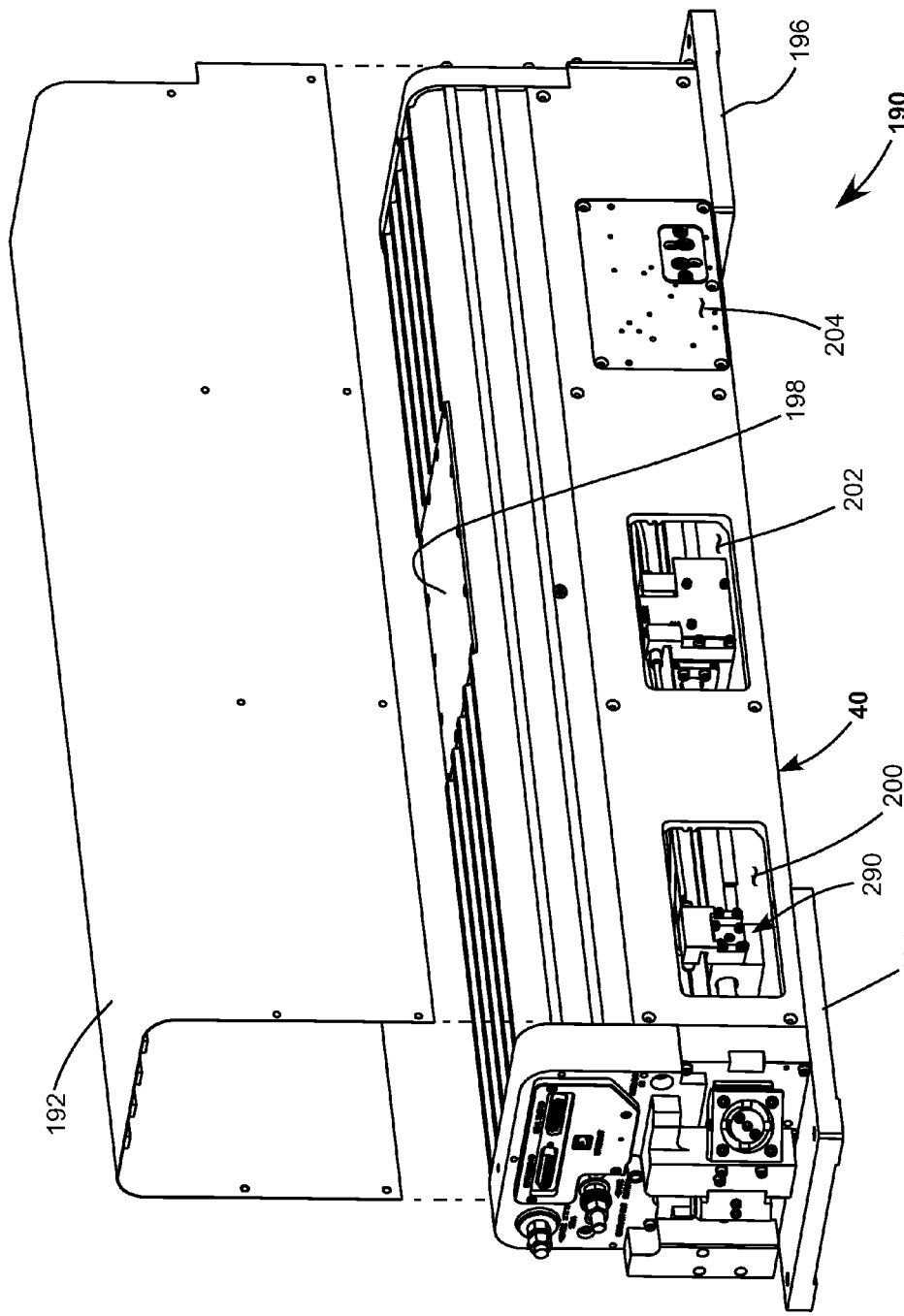
FIG. 8A is a three-dimensional view schematically illustrating the laser of FIG. with the housing-cover removed to expose apertures in the extrusion to facilitate installation and adjustment of components, including the spatial filter of FIG. 5, in the housing compartments.

FIG. 8A is an exploded three-dimensional view schematically illustrating integrated laser 190 of FIG. 8 with cover 192 removed to expose extruded housing 140.

There are three apertures or openings 198, 200, 202, and 204 cut into the extruded housing. Opening 198, shown with an optional cover, is for inserting and connecting the impedance-matching network and the hermetically sealed feed-through subassemblies into the RFPS compartment. The cover is attached after insertion and serves to prevent RF leakage from the compartment. Opening 198 is also used to drill the holes into the electrode-assembly compartment for the hermetically sealed RF feed-through to the live electrode. The above-described shallow blind-hole for the ground-electrode connection can be drilled through the feed-through holes.

Opening 200 is provided for inserting inventive spatial-filter assembly 290 (see also FIG. 5) into the beam-conditioning-components compartment of the housing. Embodiments of this spatial-filter assembly are described further hereinbelow.

Opening 202 is for inserting and adjusting beam-shaping and collimating optical lenses assemblies into the beam conditioning assembly compartment and the detector the function of which function is to inform the user whether an IR laser beam is being emitted by the laser. Beam shaping lenses are well-known in the art and a detailed description thereof is not provided herein. Opening 204 is for inserting and for making electrical connections and adjustments for the optical safety-shutter cooperative with the detector. Openings 200, 202, and 204 are also used to insert the electrical wire-harness within the wire-harness sub-compartment (50A in FIG. 5). This wire-harness, as discussed above, is required for making connections to the detector the safety shutter, and to laser-system control interface circuitry required for the detector and for the operation of the safety shutter.

Figure 9:
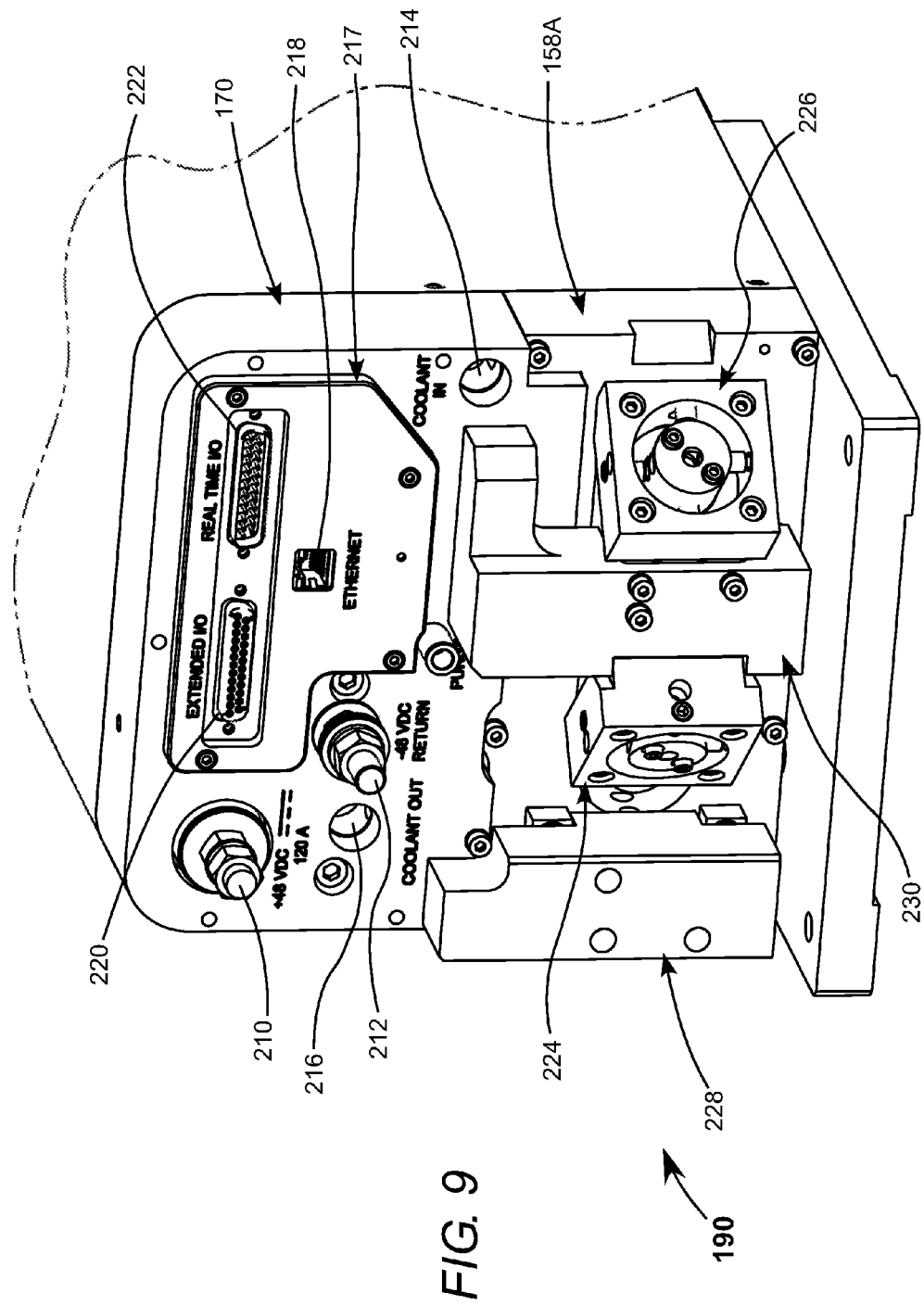
FIG. 9 is a fragmentary three-dimensional view of the laser of FIG. 8 schematically illustrating details of end-plates and components and cooling-fluid manifolds thereon at the resonator-output end of the laser.

FIG. 9 is an expanded three-dimensional view schematically illustrating the end of laser 190 as depicted FIGS. 7 and 8, this being end of the laser including the resonator output-mirror. RFPS compartment cover panel 170 panel has a 48 VDC input connector 210 and a DC ground connector 212. Cooing fluid is fed to the laser via an input port 214 and exits via an output port 216 after following a serpentine path through various components of the laser. This is described in detail further hereinbelow.

In an electronics-compartment cover 217, an ethernet connector 218 provides for supplying ON/OFF commands to the RFPS and open/close commands to the shutter. The connection also provides for receiving information on the status of the DC current, forward and reflected RF power and coolant temperature etc. Control-interface connectors 220 and 222 connect to the two PCBs (not shown) in a compartment (not shown) in end-plate 170. These connectors are used to provide pulse-repetition frequency (PRF) and modulation commands to the RFPS; and to obtain information on voltage standing-wave ratio (VSWR) fault status, RFPS duty-cycle fault status, interlock signals, and laser power-output readings.

Attached to end-plate 158A is an adjustable minor holder 224. The minor (not shown) receives a laser beam exiting the resonator past the output minor of the resonator and turns the beam about 90° through ZnSe window (not shown) hermetically sealed into the wall of the electrode-compartment of the laser. The 90-degree-turned beam is received by another minor (not shown) held by adjustable mirror-holder 226. This mirror redirects the beam by a further 90°, thereby directing the beam into the beam conditioning optics compartment, in which are the above-discussed spatial-filter assembly and other components. After passing through the spatial-filter assembly the beam propagates to a compound lens (not shown) which collimates the laser beam. A round (cross-section) collimated laser beam is delivered from the opposite end of the laser housing.

Attached to cover 158A are two detachable coolant-fluid manifolds 228 and 230. These manifolds have coolant-passages machined or drilled therein to direct the coolant through above described coolant-passages: down the length and within the sides of the extrusion of the housing; through the live and ground electrodes of the electrode assembly; through the serpentine passages in the RFPS chill-plate; and finally to flexible coolant-tubes in sub-compartment 50A of FIG. 5 for cooling the compartment and optionally the spatial filter and shutter in the beam conditioning optics compartment.

Figure 10:
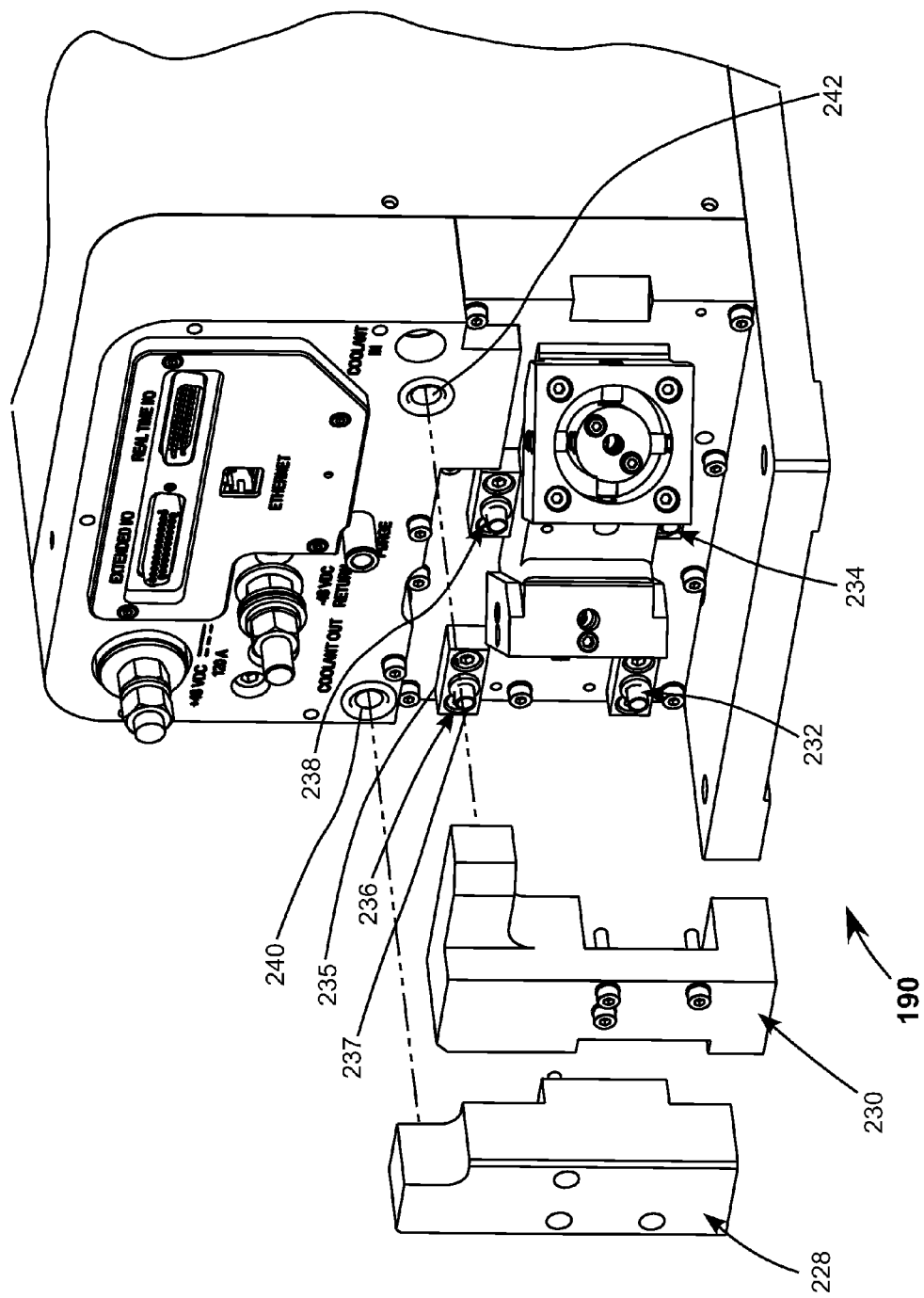
FIG. 10 is a fragmentary three-dimensional view of the laser-end of FIG. 9 with fluid-cooling manifolds removed to show detail of the attachment of electrode-cooling tubes to the end-plates.

FIG. 10 is an exploded three-dimensional view schematically illustrating the end of the laser depicted in FIG. 9 with coolant-fluid manifolds 228 and 230 detached from cover 158A. Exit-port fixture holders 232 and 234 connect the manifolds with coolant tubes of the ground electrode of the electrode assembly. Exit port fixture holders 236 and 238 connect the manifolds with the live electrode of the electrode assembly. Ports 240 and 242 connect manifolds 228 and 230, respectively, with coolant-passages in the RFPS chill-plate.

Figure 11:
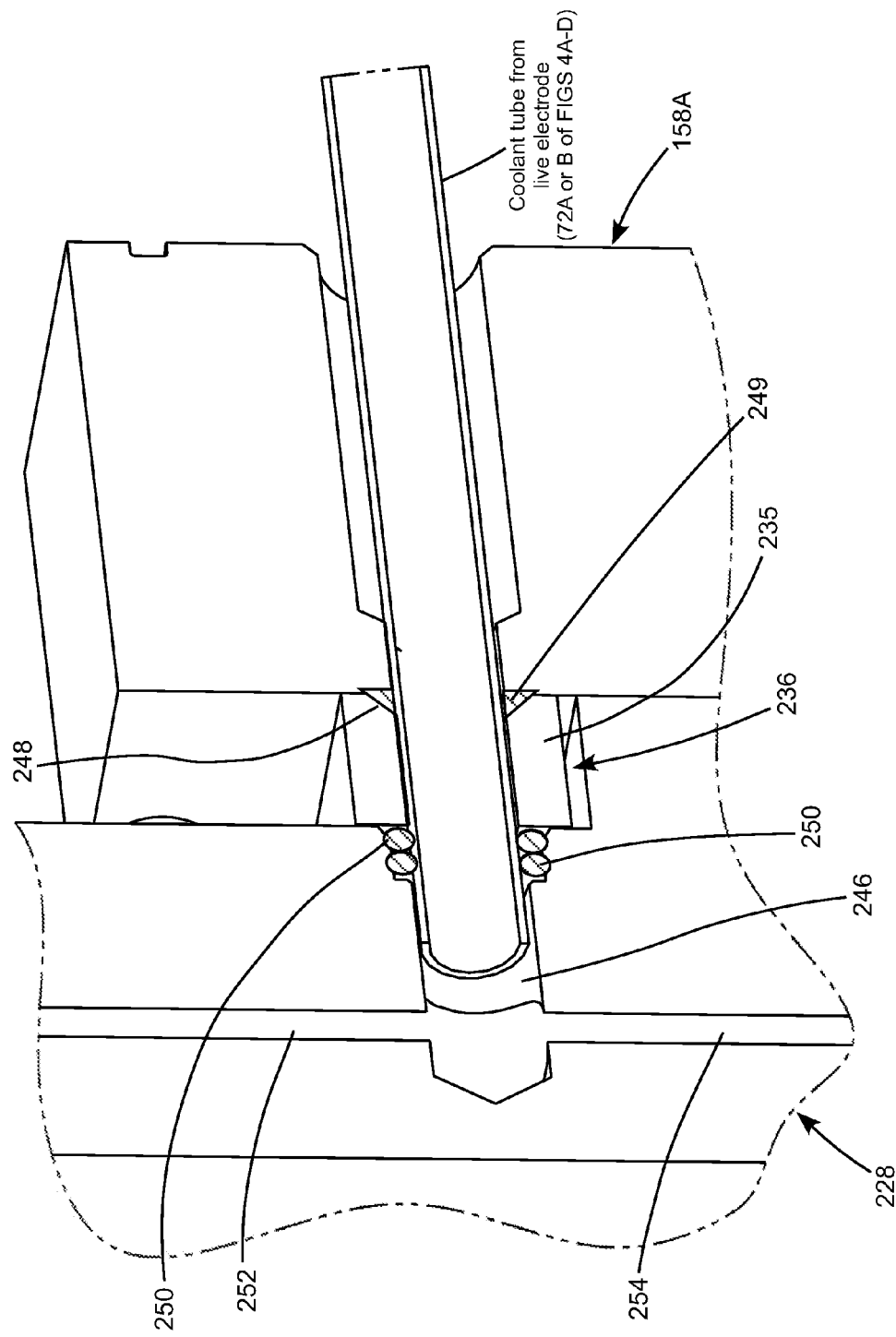
FIG. 11 is a fragmentary three-dimensional view schematically illustrating detail of the sealing of the electrode-cooling tubes to the end-plates and to the manifolds of FIG. 9.

FIG. 11 is a fragmentary, three-dimensional, cross-section view schematically illustrating an arrangement by which coolant-tubes from the electrodes can be hermetically sealed to the laser housing, here, to end plate 158A of the housing, allowing the manifolds to be detached from end plate 158A without breaking the hermetic seal. Reference is also made to FIG. 10. The end of a tube from an electrode (for example tube 72A or 72B of FIGS. 4A-D) protrudes out of the end plate and through a port-sealing block. Here block 235 of exit port fixture holder 236 (see FIG. 10) is used as an example. The protruding tube extends into a cooling passage 246 within 228.

A V-groove recess 248 in block 235 has an indium ring 249 inserted therein. When block 235 is screwed to plate 158A by screws 237 (see FIG. 10) the indium is crushed into the V-groove forming a seal between the tube and the end-plate. When the manifold is screwed to the plate, two plastic O-rings 250 are compressed against surfaces of the block, the tube, and the manifold, thereby forming form a liquid seal. The coolant tube is thus fluidly connected with tubes 252 and 254 in the manifold for redirecting flow of coolant from the tube.

It is pointed out here that this highly effective indium-sealing of the tube to the end plate is only possible as no electrical insulation is required between the tube and the plate. This is because of the tube-extension and folding providing a sufficiently high inductance that such insulation can be dispensed with, as described above with reference to FIGS. 4A-D.

Figure 12:
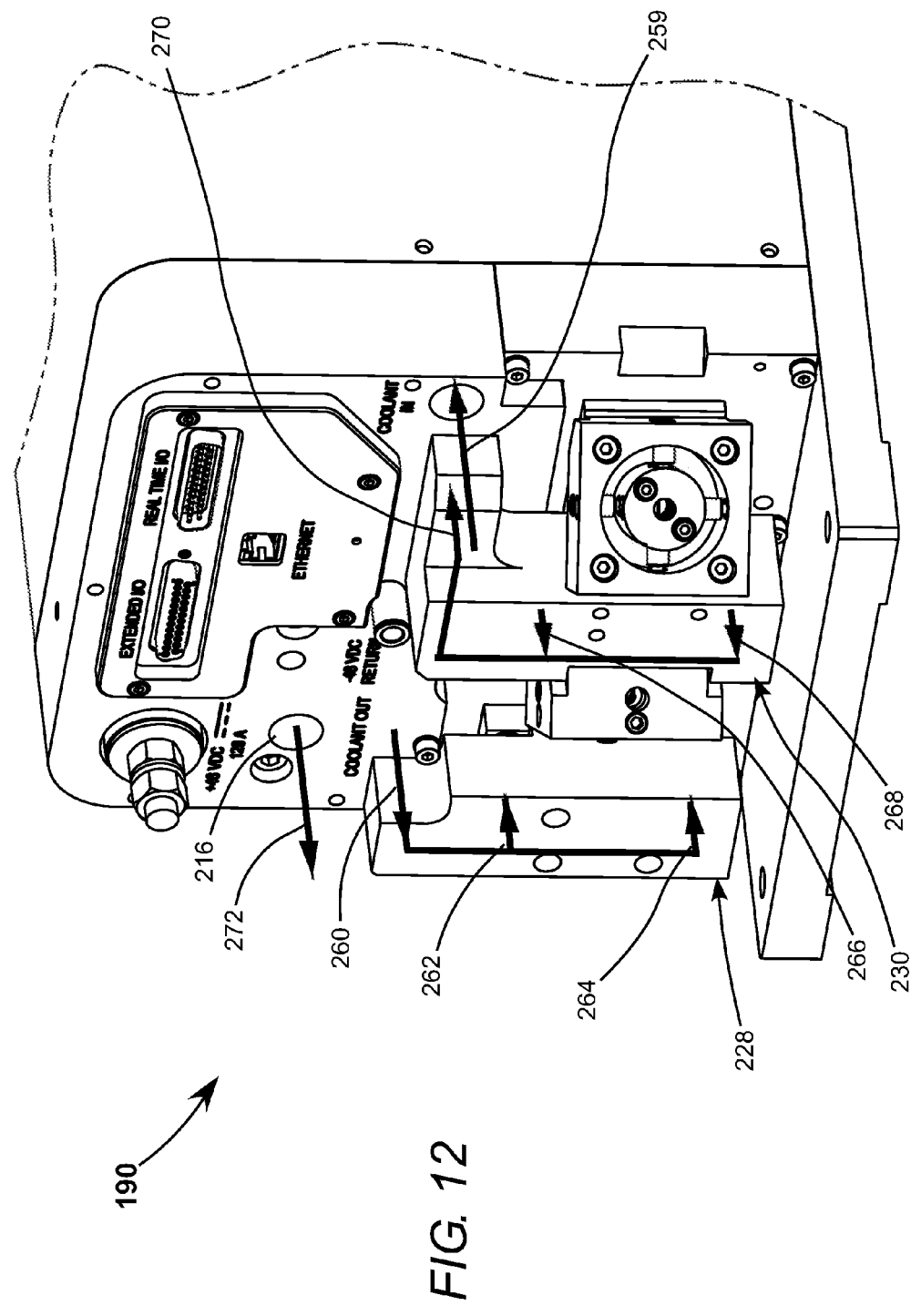
FIG. 12 is a fragmentary three-dimensional view of the laser-end of FIG. 9 schematically illustrating one example of coolant-fluid flow-patterns and directions in and out of the manifolds of FIG. 8.

FIG. 12 is similar to FIG. 9, but schematically depicts the path of fluid-coolant through manifolds 228 and 230 and the contribution of the manifolds to distributing coolant from the single input to the single output. Reference is made in addition to FIG. 5. Coolant flow begins at input port 214 as indicated by arrow 259 and proceeds down the length of the extruded housing coolant passage 62A (see FIG. 5). In an end-cover at the opposite end of the laser there is a horizontal channel which connects coolant passage 62A of FIG. 5, with passage 62B of FIG. 5. The coolant flows back through passage 62B into manifold 228 as indicated in FIG. 12 by arrow 260.

Manifold 228 directs the coolant-flow through tubes 252 and 254 of the manifold (see FIG. 11) via ports 236 and 232 (see FIG. 10) as indicated by arrows 262 and 264 into coolant-tubes of respectively the live- and ground-electrodes. The coolant flows through the electrodes and into manifold 230 as indicated by arrows 266 and 268. Manifold 230 combines the flow and directs the flow upward into the RFPS chill-plate via port 242 of the end-plate (see FIG. 10) as indicated by arrow 270. In the RFPS chill-plate (cooling-plate) the coolant makes the four longitudinal passes depicted in FIG. 5A before exiting laser 190 from coolant-exit port 216 as indicated by arrow 272.

If cooling of components in the beam-conditioning components compartment is required, a tap-off of the input coolant can be made and directed into flexible plastic tubes in sub-compartment 50A of FIG. 5. This coolant would be returned by a corresponding connection and flow together with other coolant down an opposite side of the housing into manifold 228. Such an arrangement is not shown for simplicity of illustration. Alternatively, a separate coolant circuit could be set up for components of compartment 50A.

Figure 13:
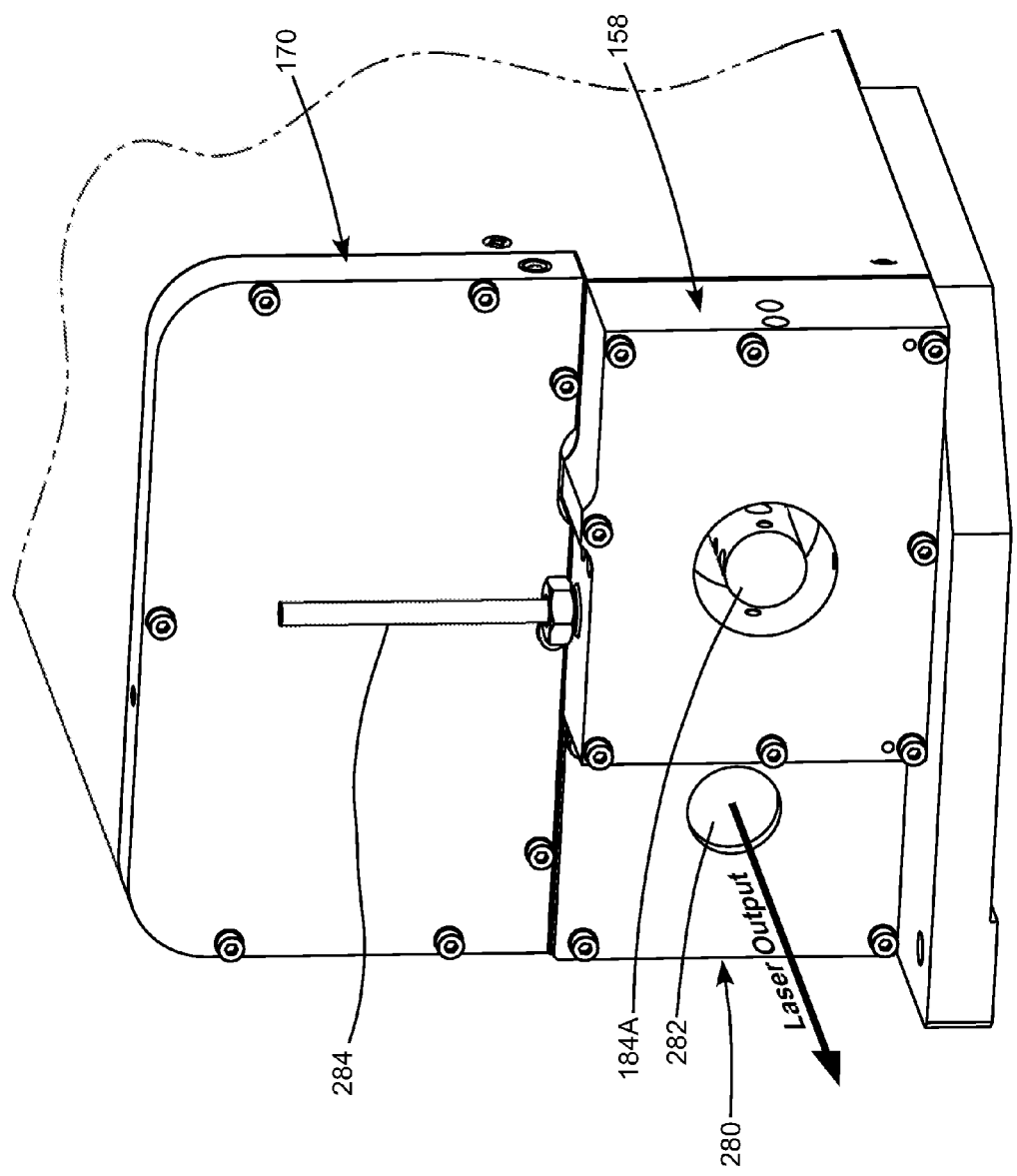
FIG. 13 is a fragmentary three-dimensional view of the laser of FIG. 8 schematically illustrating details of end-plates and components at the laser-beam end of the laser.

FIG. 13 is an expanded three-dimensional view schematically illustrating the end of laser 190 opposite the end depicted in FIG. 9. This view corresponds to the "inside" detailed views of FIG. 7 and FIG. 7A. Components of note include an adjustment-post 184A in end plate 158 for high-reflecting mirror 150 (see FIGS. 7 and 7A). Output of laser 190 is through a window 282 in a plate 280 covering the beam conditioning optics compartment. A conduit 284 has three functions. One function is as a pump-out port for the electrode assembly compartment. Another function is that of a laser gas filling port for the compartment. Yet another function is as "pinch-off" port for hermetically sealing the laser gas mixture within the resonator assembly compartment after the laser-gas filling.

Turning now to components of the beam-conditioning components compartment, one particularly important such component is the above-discussed spatial-filter assembly, which is required for stripping unwanted spurious modes for the beam output from the laser resonator. Such spatial filters are used for this purpose in prior art $CO_2$ slab-lasers. In order to be compatible with the compact arrangement of the inventive laser, however, inventive redesign of the spatial filter assembly was necessary. One reason for re-design was the need to adjust the assembly in the beam-conditioning optics compartment via side-opening 200 (see FIG. 8A) of the laser housing extrusion, i.e., from only one side of the assembly. Another reason was to be able to mount the assembly on dovetail rail 54 (see FIG. 3) of the mounting beam-conditioning optics compartment. Yet another re-design reason was to provide for optional fluid-cooling of the assembly as discussed above.

Figure 14:
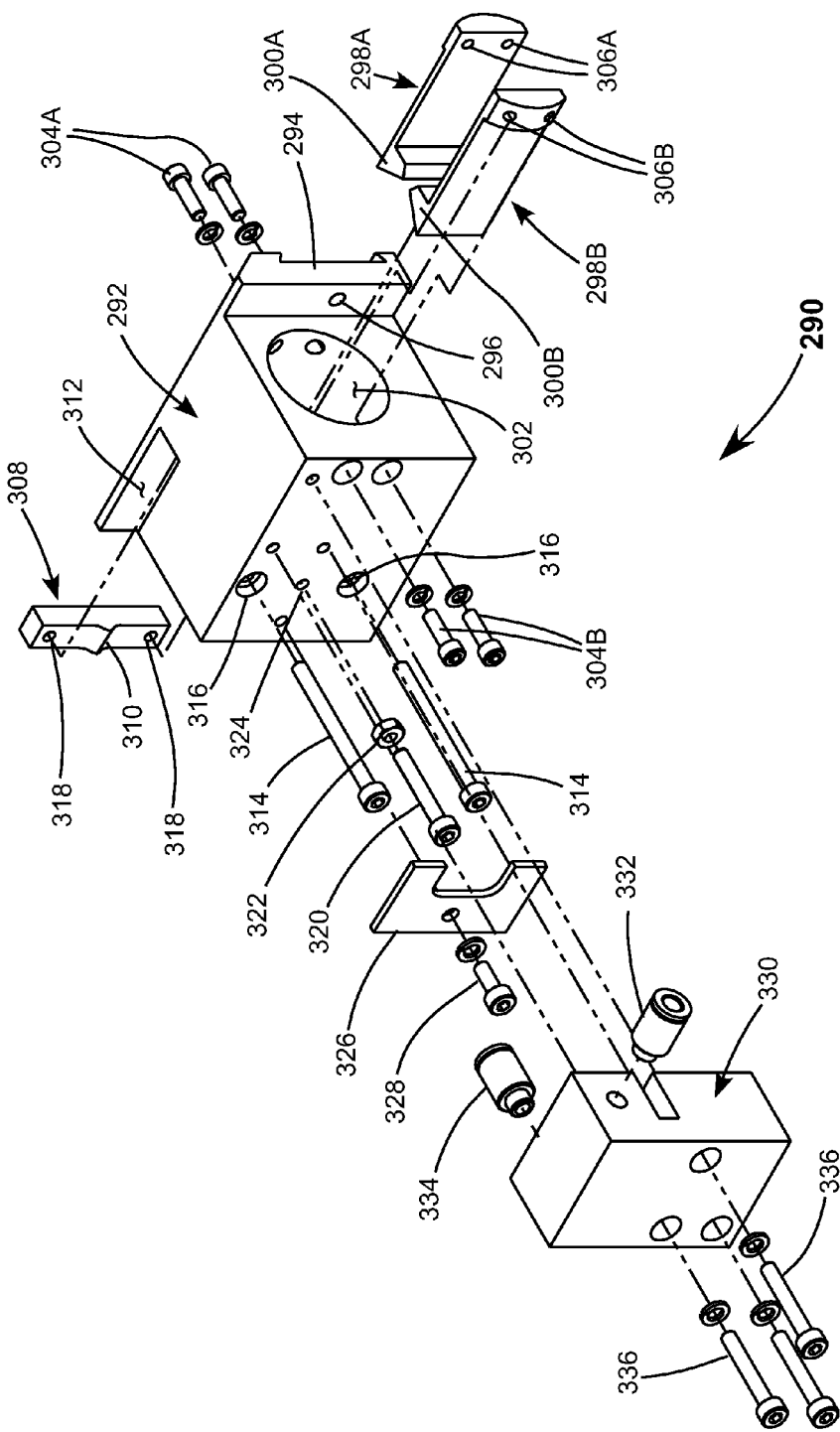
FIG. 14 is an exploded three-dimensional view schematically illustrating details of one preferred embodiment of the spatial-filter assembly in the third compartment of the laser of FIGS. 8 and 8A.

FIG. 14 is an exploded three-dimensional view of one example 290 of a redesigned spatial-filter assembly for the inventive laser. A machined spatial-filter housing block 292 includes an inverted dove-tail member 294 which can be slid onto dovetail rail 54 of FIG. 3. The assembly can be locked in place on the rail by screws (not shown) threaded into holes 296 on each end of member 294.

Copper inserts 298A and 298B have-knife edges 300A and 300B respectively machined thereon. All other parts of the assembly can be made from aluminum. Inserts 298A and 298B are inserted into the opening 302 of spatial filter housing block 292. The ends of the copper inserts opposite to the knife-edges are held in place within opening 302 by two sets of screws 304A and 304B threaded into the spatial-filter housing-block, and into holes 306A and 306B in opposite ends of the inserts. Screws 304A and 304B determine how far within opening 302 the inserts are located.

A metal knife-edge pusher 308, having a horizontally machined knife-edge 310 thereon, is inserted into a slot 312 in spatial-filter housing-block 292. The knife-edge pusher is held in place by two long screws 314 threaded through holes 316 in block 292 and into two threaded blind holes 318 in knife-edge pusher 308. These two long screws hold knife-edge 310 of the pusher against the back of knife-edge 300A on insert 298A.

A screw 320, having a locknut 322, is threaded through a hole 324 in the spatial-filter housing-block. This screw is used as a combined pusher and stop for knife-edge 300B of insert 298B for adjusting the position of that knife-edge. The two long screws 314, cooperative with pusher 308, are used to adjust the position of knife-edge 300A of insert 298A. This allows both knife-edges (forming the spatial filter) to be adjustable from one side of assembly 290, through the corresponding aperture in the laser-housing extrusion.

A lock-plate cover 326 is held in place on the spatial-filter housing-block by screw 328. The lock-plate cover retains the position of adjusting screws 314 and 320 after knife-edge adjustment is completed. A fluid-cooling block 330 can be used for optional fluid-cooling. Coolant is delivered and extracted through fixtures 332 and 334 and circulates in the block through channels (not shown). The cooling block is clamped to the spatial-filter housing-block by three screws 336.

Assembly 290 is further schematically illustrated by FIG. 15 (three-D view in a completely assembled form); by FIG. 15A (side-elevation in a completely assembled form); by FIG. 15B, which is a cross-section view seen generally in direction A-A of FIG. 15A; and by FIG. 15C, which is a cross-section view seen generally in direction B-B of FIG. 15A. The action of adjusting screws 314 and 320 is particularly clear from the cross-section views.

Figure 16:
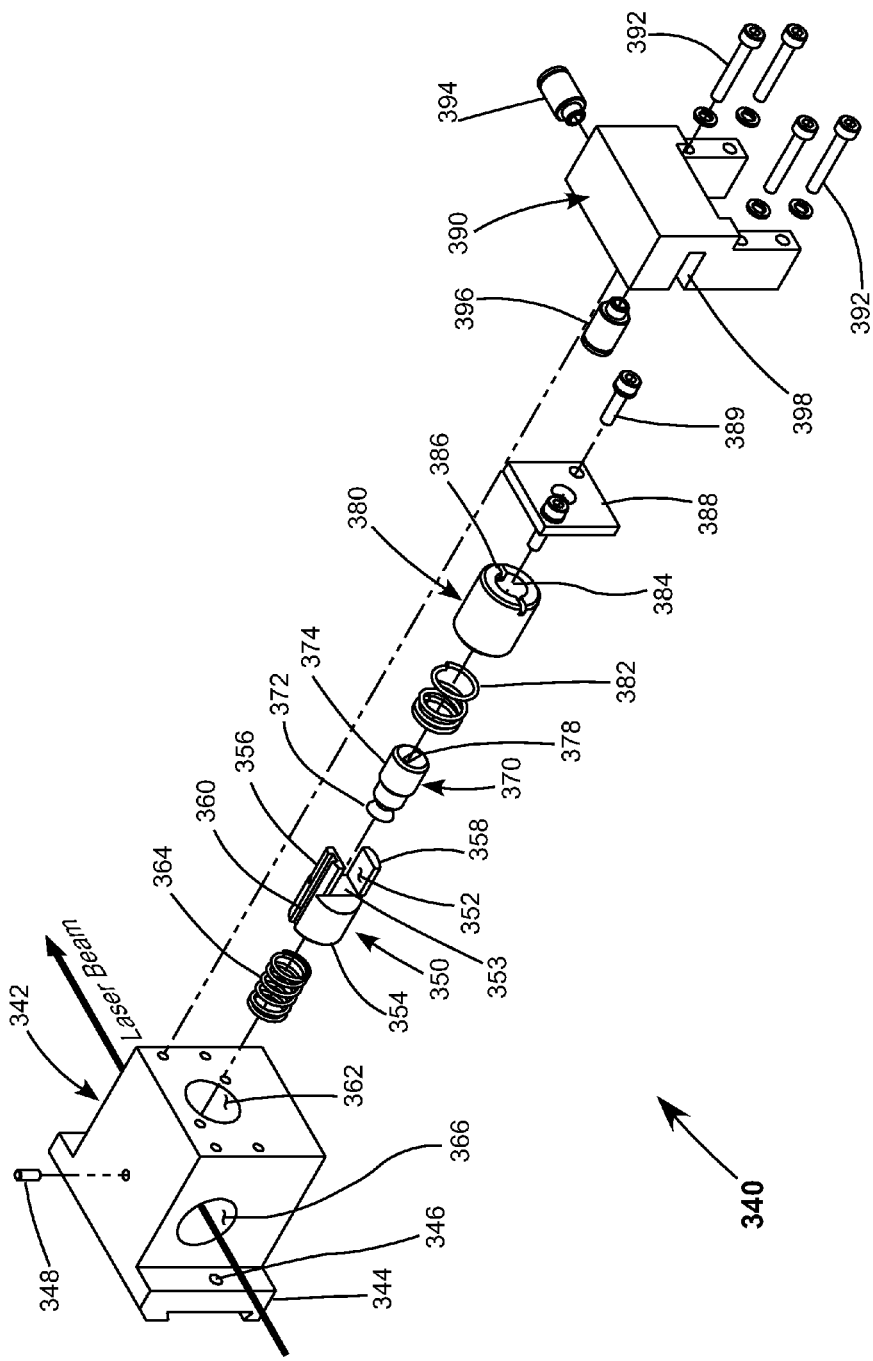
FIG. 16 is an exploded three-dimensional view schematically illustrating details of another preferred embodiment of the spatial-filter assembly in the third compartment of the laser of FIGS. 8 and 8A.
Figure 17:
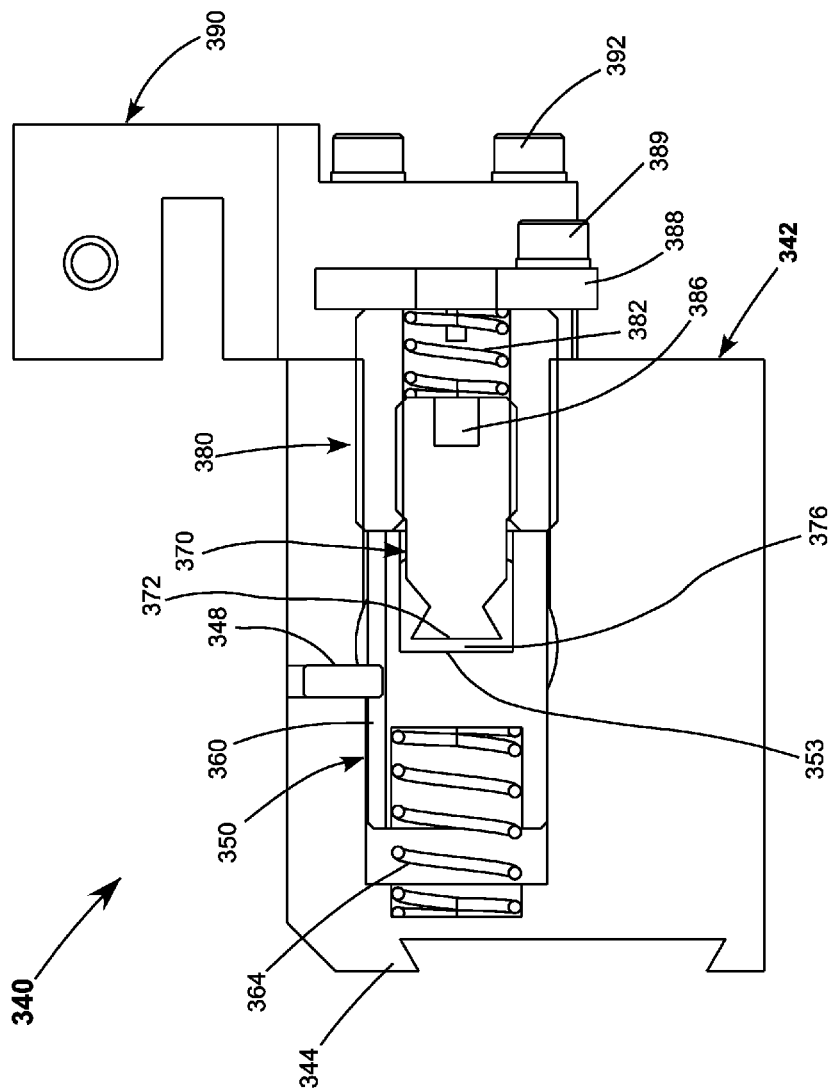
FIG. 17 is a cross-section view of the spatial-filter assembly of FIG. 16 in assembled form schematically illustrating details of the interaction of components thereof.

FIG. 16 is an exploded three-dimensional view schematically illustrating another example 340 of spatial-filter assembly suitable for use in the inventive compact laser. FIG. 17 is a longitudinal cross-section view of assembly 340 in assembled form. It is useful for following the description set forth below to make reference to both drawings.

Assembly 340 includes a spatial-filter housing-block 342 having a V-groove member 344 machined on the back side for mounting the assembly dovetail rail of FIG. 3. Threaded holes 346, one on each side, are provided for holding the assembly firmly against the rail by screws (not shown). One spatial-filter element 350 is formed by matching slot 352 in a copper cylinder 354 leaving an upper portion 356 a lower portion 358 and a first spatial-filter surface 353 on the cylinder. A groove or slot 360 is machined in the upper portion of the cylinder. Spatial-filter element 350 is inserted into a partially-threaded hole 362 in housing 342, preceded by a compression spring 364. The element is a sliding-close-fit in the unthreaded portion of the hole. A pin 348 is used to engage slot 360 for vertically fixing the orientation of spatial-filter element 350 (see FIG. 17). This orientation is such that the laser-beam traversing the housing via aperture 366 therein can pass through the slot in the spatial-filter element.

Another spatial-filter element 370 is also machined from a copper cylinder. A round flat surface 372 is machined on the end of the cylinder forming a second spatial-filter surface. The end 374 of the cylinder opposite surface 372 is threaded. Element 370 is inserted into slot 352 in element 350. Surface 353 of element 350 and surface 372 of element 350 form the spatial-filter gap designated as gap 376 in FIG. 17.

Threaded end 374 of element 370 is screwed into mating thread within a cylinder 380 against a compression spring 382. The outside of cylinder 380 is threaded for engaging the threaded portion of the hole (see FIG. 17). Element 370 has a screwdriver-slot 378 in the end thereof opposite spatial-filter surface 372. This slot is accessible through an aperture 384 in the end of cylinder 380. This end of cylinder 380 has slots 386 therein to allow the cylinder to be turned by a flat edged-tool such as a big screwdriver.

It can be seen particularly in FIG. 17 that screwing cylinder 350 in or out of hole 362, cooperative with spring 364 adjusts the position of spatial filter surface 353 in the housing. Screwing element 370 in or out of cylinder 380 adjusts the position of spatial filter surface 372. The spatial filter assembly is held together by an aluminum locking retainer 388 and screw 389 threaded into corresponding blind, threaded holes in housing 342. A cooling block 390 is attached to housing 342 by screws 392. The cooling block has internal channels (not shown) fluidly accessible via input and fixtures 394 and 396. A slot 398 machined into the cooling block provides additional support for the metal sheet that divides the beam conditioning optics compartment of the housing into two sub-compartments (see FIG. 5).

The present invention is described above in terms of a preferred embodiment. The invention, however, is not limited to the embodiment described and depicted. Rather the embodiment is defined by the claims appended hereto.

What is claimed is:

1. $CO_2$ radio frequency (RF) gas-discharge laser apparatus, comprising:
   a laser housing formed from an elongated metal extrusion, the extrusion configured to permit passage of coolant fluid therethrough for cooling the housing;
   first and second elongated discharge-electrodes located in the laser housing, spaced apart and parallel to each other defining a discharge gap therebetween, the first electrode functioning as a live-electrode and the second electrode functioning as a ground electrode, the discharge-electrodes being configured to permit passage of coolant fluid therethrough for cooling the electrodes;
   first and second resonator mirrors defining a laser resonator extending through the discharge-gap between the discharge-electrodes; and
   a radio-frequency power-supply (RFPS) and an impedance-matching network located in the laser housing for supplying RF power to the electrodes for creating a RF discharge in the discharge gap for causing a laser beam to be generated and delivered from the laser resonator, the RFPS being assembled on an elongated metal mounting-plate configured to permit passage of coolant fluid therethrough for cooling the RFPS assembled thereon.

2. The apparatus of claim 1, further including an arrangement for combining the coolant fluid passage through the metal extrusion, the electrodes and the metal mounting plate of the RFPS into a coolant-circuit with a single coolant-fluid input and a single coolant-fluid output.

3. The apparatus of claim 2, wherein the coolant-circuit is arranged such that the coolant fluid delivered into the coolant input flows, in sequence, through the metal housing extrusion; through the electrodes, and through the metal mounting plate of the RFPS before exiting the coolant circuit via the coolant output.

4. The apparatus of claim 3, wherein the housing extrusion has first and second opposite outer walls and the coolant-passage arrangement of the housing-extrusion includes a first coolant-channel extending within and along the length of the first outer wall of the housing and a second coolant-channel extending within and along the length of the second outer wall of the housing.

5. The apparatus of claim 3, wherein the coolant-passage arrangement of the electrodes includes first and second cooling-tubes passing through respectively the first and second discharge electrodes.

6. The apparatus of claim 5, wherein each of the first and second cooling-tubes enters and exits the corresponding electrode at the same end thereof.

7. The apparatus of claim 3, wherein the coolant passage arrangement of the RFPS mounting-plate includes a first plurality longitudinal coolant-channels extending along the length of the elongated mounting plate and a second plurality of lateral coolant-channels extending along the width of the mounting plate, with the channels arranged such that coolant-fluid enters one of the longitudinal coolant-channels and leaves another of the longitudinal coolant-channels after following a serpentine path through the remaining channels.

8. The apparatus of claim 7, wherein there are four longitudinal channels and three lateral channels arranged such that the coolant-fluid enters and exits the mounting-plate at the same end thereof.

9. The apparatus of claim 1, wherein the housing extrusion has longitudinally extending internal walls arranged to divide the housing into first, second, and third longitudinally extending compartments, with the RFPS being located in the first compartment, the electrodes and resonator-mirrors being located in the second compartment and wherein the laser beam generated delivered by the resonator exits the first compartment through a window therein and is directed by first and second minors attached to the housing into the third compartment.

10. The apparatus of claim 9, further including a spatial-filter assembly located in the third compartment, the spatial filter assembly having two adjustable filter members arranged with a gap therebetween through which the laser beam passes for stripping unwanted modes therefrom, the filter members being independently adjustable in lateral position for varying the width and position of the gap.

11. The apparatus of claim 10, wherein there is an aperture in the side of the third compartment providing access to the spatial-filter assembly, and wherein the spatial-filer assembly is configured such that the independent adjustment of the filter members can be made from a side of the spatial filer assembly facing the aperture.

12. The apparatus of claim 9, wherein the first compartment is hermetically sealed by first and second metal end-plates attached to the housing via soft-metal seal elements.

13. The apparatus of claim 12 wherein the first-electrode cooling configuration includes an elongated U-shaped metal tube extending therethrough with first and second end portions of the metal tube extending from the same end of the electrode and providing respectively input and output conduits for the coolant fluid, the end portions being twice folded back-on themselves, then extending through the first metal end-plate sealed thereto via a soft metal seal, the length of the twice-folded end portions of the metal between the electrode and the metal end-plate being selected such that the twice-folded ends of the tube have sufficiently high inductance at the operating frequency of the RFPS to prevent significant leakage of RF power from the first electrode to the metal end-plate via the tube.

\* \* \* \* \*